US009998365B2

(12) United States Patent
Kancherla

(10) Patent No.: US 9,998,365 B2
(45) **Date of Patent: *Jun. 12, 2018**

(54) NETWORK FEEDBACK IN SOFTWARE-DEFINED NETWORKS

(71) Applicant: BROCADE COMMUNICATIONS SYSTEMS, INC., San Jose, CA (US)

(72) Inventor: Mani Prasad Kancherla, Cupertino, CA (US)

(73) Assignee: BROCADE COMMUNICATIONS SYSTEMS, LLC, San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/047,539

(22) Filed: Feb. 18, 2016

(65) Prior Publication Data

US 2016/0173393 A1 Jun. 16, 2016

Related U.S. Application Data

(63) Continuation of application No. 13/890,150, filed on May 8, 2013, now Pat. No. 9,374,301.

(Continued)

(51) Int. Cl.

*H04L 12/717* (2013.01)
*H04L 12/26* (2006.01)

(Continued)

(52) U.S. Cl.

CPC .......... *H04L 45/42* (2013.01); *H04L 41/0893* (2013.01); *H04L 41/0896* (2013.01);

(Continued)

(58) Field of Classification Search

CPC ...................................................... H04L 45/42

See application file for complete search history.

(56) References Cited

U.S. PATENT DOCUMENTS 829,529 A 8/1906 Keathley
5,390,173 A 2/1995 Spinney (Continued)

FOREIGN PATENT DOCUMENTS

CN 1735062 2/2006
CN 1777149 5/2006

(Continued)

OTHER PUBLICATIONS

Office Action dated Jan. 31, 2017, U.S. Appl. No. 13/184,526, filed Jul. 16, 2011.

(Continued)

*Primary Examiner* — Gerald A Smarth

(74) *Attorney, Agent, or Firm* — Shun Yao; Park, Vaughan, Fleming & Dowler LLP

(57) ABSTRACT

One embodiment of the present invention provides a computing system capable of providing feedback to a controller in a software-defined network. The computing system includes a policy management module and a communication module coupled to the policy management module. During operation, the policy management module recognizes a local policy indicating how a data flow is to be processed and identifies a data flow associated with the policy. The communication module constructs a request for a flow definition from a controller in a software-defined network. A flow definition indicates how the data flow is processed in the software-defined network.

20 Claims, 10 Drawing Sheets

START
RECEIVE FEEDBACK MESSAGE FROM DEVICE REQUESTING FLOW DEFINITION 252
ANY OTHER RELATED REQUEST(S)? 254
NO
YES
RETRIEVE RELATED REQUEST(S) 256
ANALYZE REQUEST(S) TO GENERATE FLOW DEFINITIONS 258
REQUEST CURRENTLY ADDRESSABLE? 260
YES
NO
STORE REQUEST FOR FUTURE EVALUATION 270
GENERATE FLOW DEFINITION(S) BASED ON REQUEST(S) 262
IDENTIFY SWITCH(ES) ASSOCIATED WITH FLOW DEFINITION(S) 264
CONSTRUCT NOTIFICATION MESSAGE(S) COMPRISING GENERATED FLOW DEFINITION(S) 266
SEND RESPECTIVE NOTIFICATION MESSAGE TO CORRESPONDING IDENTIFIED SWITCH(ES) 268
RETURN

Related U.S. Application Data

(60) Provisional application No. 61/649,034, filed on May 18, 2012.

(51) Int. Cl.
*H04L 12/24* (2006.01)
*H04L 12/851* (2013.01)
*H04L 29/06* (2006.01)

(52) U.S. Cl.
CPC ........ *H04L 43/026* (2013.01); *H04L 47/2483* (2013.01); *H04L 69/22* (2013.01)

(56) References Cited

U.S. PATENT DOCUMENTS 5,802,278 A 9/1998 Isfeld
5,878,232 A 3/1999 Marimuthu
5,959,968 A 9/1999 Chin
5,973,278 A 10/1999 Wehrill, III
5,983,278 A 11/1999 Chong
6,041,042 A 3/2000 Bussiere
6,085,238 A 7/2000 Yuasa
6,104,696 A 8/2000 Kadambi
6,185,214 B1 2/2001 Schwartz
6,185,241 B1 2/2001 Sun
6,331,983 B1 12/2001 Haggerty
6,438,106 B1 8/2002 Pillar
6,498,781 B1 12/2002 Bass
6,542,266 B1 4/2003 Phillips
6,633,761 B1 10/2003 Singhal
6,771,610 B1 8/2004 Seaman
6,870,840 B1 3/2005 Hill
6,873,602 B1 3/2005 Ambe
6,920,503 B1 7/2005 Nanji
6,937,576 B1 8/2005 DiBenedetto
6,956,824 B2 10/2005 Mark
6,957,269 B2 10/2005 Williams
6,975,581 B1 12/2005 Medina
6,975,864 B2 12/2005 Singhal
7,016,352 B1 3/2006 Chow
7,061,877 B1 6/2006 Gummalla
7,097,308 B2 8/2006 Kim et al.
7,173,934 B2 2/2007 Lapuh
7,197,308 B2 3/2007 Singhal
7,206,288 B2 4/2007 Cometto
7,310,664 B1 12/2007 Merchant
7,313,637 B2 12/2007 Tanaka
7,315,545 B1 1/2008 Chowdhury et al.
7,316,031 B2 1/2008 Griffith
7,330,897 B2 2/2008 Baldwin
7,380,025 B1 5/2008 Riggins
7,397,768 B1 7/2008 Betker
7,397,794 B1 7/2008 Lacroute
7,430,164 B2 9/2008 Bare
7,453,888 B2 11/2008 Zabihi
7,477,894 B1 1/2009 Sinha
7,480,258 B1 1/2009 Shuen
7,508,757 B2 3/2009 Ge
7,558,195 B1 7/2009 Kuo
7,558,273 B1 7/2009 Grosser
7,571,447 B2 8/2009 Ally
7,599,901 B2 10/2009 Mital
7,653,056 B1 1/2010 Dianes
7,688,736 B1 3/2010 Walsh
7,688,960 B1 3/2010 Aubuchon
7,690,040 B2 3/2010 Frattura
7,706,255 B1 4/2010 Kondrat et al.
7,716,370 B1 5/2010 Devarapalli
7,720,076 B2 5/2010 Dobbins
7,729,296 B1 6/2010 Choudhary
7,787,480 B1 8/2010 Mehta
7,792,920 B2 9/2010 Istvan
7,796,593 B1 9/2010 Ghosh
7,808,992 B2 10/2010 Homchaudhuri
7,836,332 B2 11/2010 Hara
7,843,906 B1 11/2010 Chidambaram et al.
7,843,907 B1 11/2010 Abou-Emara
7,860,097 B1 12/2010 Lovett
7,898,959 B1 3/2011 Arad
7,912,091 B1 3/2011 Krishnan
7,924,837 B1 4/2011 Shabtay
7,937,438 B1 5/2011 Miller
7,937,756 B2 5/2011 Kay
7,945,941 B2 5/2011 Sinha
7,949,638 B1 5/2011 Goodson
7,957,386 B1 6/2011 Aggarwal
8,018,938 B1 9/2011 Fromm
8,027,354 B1 9/2011 Portolani
8,054,832 B1 11/2011 Shukla
8,068,442 B1 11/2011 Kompella
8,078,704 B2 12/2011 Lee
8,090,805 B1 1/2012 Chawla
8,102,781 B2 1/2012 Smith
8,102,791 B2 1/2012 Tang
8,116,307 B1 2/2012 Thesayi
8,125,928 B2 2/2012 Mehta
8,134,922 B2 3/2012 Elangovan
8,155,150 B1 4/2012 Chung
8,160,063 B2 4/2012 Maltz
8,160,080 B1 4/2012 Arad
8,170,038 B2 5/2012 Belanger
8,175,107 B1 5/2012 Yalagandula
8,095,774 B1 6/2012 Lambeth
8,194,674 B1 6/2012 Pagel
8,195,774 B2 6/2012 Lambeth
8,204,061 B1 6/2012 Sane
8,213,313 B1 7/2012 Doiron
8,213,336 B2 7/2012 Smith
8,230,069 B2 7/2012 Korupolu
8,239,960 B2 8/2012 Frattura
8,249,069 B2 8/2012 Raman
8,270,401 B1 9/2012 Barnes
8,295,291 B1 10/2012 Ramanathan
8,295,921 B2 10/2012 Wang
8,301,686 B1 10/2012 Appajodu
8,339,994 B2 12/2012 Gnanasekaran
8,351,352 B1 1/2013 Eastlake
8,369,335 B2 2/2013 Jha
8,369,347 B2 2/2013 Xiong
8,392,496 B2 3/2013 Linden
8,451,717 B2 5/2013 Srikrishnan
8,462,774 B2 6/2013 Page
8,465,774 B2 6/2013 Page
8,467,375 B2 6/2013 Blair
8,520,595 B2 8/2013 Yadav
8,553,710 B1 10/2013 White
8,595,479 B2 11/2013 Radhakrishnan
8,599,850 B2 12/2013 Ha
8,599,864 B2 12/2013 Chung
8,615,008 B2 12/2013 Natarajan
8,619,788 B1 12/2013 Sankaran
8,625,616 B2 1/2014 Vobbilisetty
8,705,526 B1 4/2014 Hasan
8,706,905 B1 4/2014 McGlaughlin
8,717,895 B2 5/2014 Koponen
8,724,456 B1 5/2014 Hong
8,792,501 B1 7/2014 Rustagi
8,798,055 B1 8/2014 An
8,804,732 B1 8/2014 Hepting
8,804,736 B1 8/2014 Drake
8,806,031 B1 8/2014 Kondur
8,812,727 B1 * 8/2014 Sorenson, III .......... H04L 47/70 709/219
8,826,385 B2 9/2014 Congdon
8,918,631 B1 12/2014 Kumar
8,937,865 B1 1/2015 Kumar
8,948,181 B2 2/2015 Kapadia
8,971,173 B1 3/2015 Choudhury
8,995,272 B2 3/2015 Agarwal
9,019,976 B2 4/2015 Gupta
9,178,793 B1 11/2015 Marlow
9,231,890 B2 1/2016 Vobbilisetty
9,401,818 B2 7/2016 Venkatesh
9,438,447 B2 9/2016 Basso

(56) References Cited

U.S. PATENT DOCUMENTS 9,524,173 B2 12/2016 Guntaka
9,626,255 B2 4/2017 Guntaka
9,628,407 B2 4/2017 Guntaka
2001/0005527 A1 6/2001 Vaeth
2001/0055274 A1 12/2001 Hegge
2002/0019904 A1 2/2002 Katz
2002/0021701 A1 2/2002 Lavian
2002/0027885 A1 3/2002 Ben-Ami
2002/0039350 A1 4/2002 Wang
2002/0054593 A1 5/2002 Morohashi
2002/0087723 A1 7/2002 Williams
2002/0091795 A1 7/2002 Yip
2003/0026290 A1 2/2003 Umayabashi
2003/0041085 A1 2/2003 Sato
2003/0097470 A1 5/2003 Lapuh
2003/0123393 A1 7/2003 Feuerstraeter
2003/0147385 A1 8/2003 Montalvo
2003/0152075 A1 8/2003 Hawthorne
2003/0174706 A1 9/2003 Shankar
2003/0189905 A1 10/2003 Lee
2003/0208616 A1 11/2003 Laing
2003/0216143 A1 11/2003 Roese
2004/0001433 A1 1/2004 Gram
2004/0003094 A1 1/2004 See
2004/0010600 A1 1/2004 Baldwin
2004/0047349 A1 3/2004 Fujita
2004/0049699 A1 3/2004 Griffith
2004/0057430 A1 3/2004 Paavolainen
2004/0081171 A1 4/2004 Finn
2004/0117508 A1 6/2004 Shimizu
2004/0120326 A1 6/2004 Yoon
2004/0156313 A1 8/2004 Hofmeister et al.
2004/0165595 A1 8/2004 Holmgren
2004/0165596 A1 8/2004 Garcia
2004/0205234 A1 10/2004 Barrack
2004/0213232 A1 10/2004 Regan
2004/0225725 A1 11/2004 Enomoto
2005/0007951 A1 1/2005 Lapuh
2005/0025179 A1 2/2005 McLaggan
2005/0036488 A1* 2/2005 Kalkunte ............ H04L 49/351
370/389
2005/0044199 A1 2/2005 Shiga
2005/0074001 A1 4/2005 Mattes
2005/0094568 A1 5/2005 Judd
2005/0094630 A1 5/2005 Valdevit
2005/0111352 A1 5/2005 Ho
2005/0122979 A1 6/2005 Gross
2005/0152335 A1 7/2005 Lodha
2005/0157645 A1 7/2005 Rabie et al.
2005/0157751 A1 7/2005 Rabie
2005/0169188 A1 8/2005 Cometto
2005/0195813 A1 9/2005 Ambe
2005/0207423 A1 9/2005 Herbst
2005/0213561 A1 9/2005 Yao
2005/0220096 A1 10/2005 Friskney
2005/0265330 A1 12/2005 Suzuki
2005/0265356 A1 12/2005 Kawarai
2005/0278565 A1 12/2005 Frattura
2006/0007869 A1 1/2006 Hirota
2006/0018302 A1 1/2006 Ivaldi
2006/0023707 A1 2/2006 Makishima
2006/0029055 A1 2/2006 Perera
2006/0034292 A1 2/2006 Wakayama
2006/0036765 A1 2/2006 Weyman
2006/0039366 A1 2/2006 Ghosh
2006/0059163 A1 3/2006 Frattura
2006/0062187 A1 3/2006 Rune
2006/0072550 A1 4/2006 Davis
2006/0083254 A1 4/2006 Ge
2006/0092860 A1 5/2006 Higashitaniguchi
2006/0093254 A1 5/2006 Mozdy
2006/0098589 A1 5/2006 Kreeger
2006/0126511 A1 6/2006 Youn
2006/0140130 A1 6/2006 Kalkunte
2006/0155828 A1 7/2006 Ikeda
2006/0168109 A1 7/2006 Warmenhoven
2006/0184937 A1 8/2006 Abels
2006/0206655 A1* 9/2006 Chappell ............ G06F 13/4027
710/315
2006/0221960 A1 10/2006 Borgione
2006/0227776 A1 10/2006 Chandrasekaran
2006/0235995 A1 10/2006 Bhatia
2006/0242311 A1 10/2006 Mai
2006/0245439 A1 11/2006 Sajassi
2006/0251067 A1 11/2006 DeSanti
2006/0256767 A1 11/2006 Suzuki
2006/0265515 A1 11/2006 Shiga
2006/0285499 A1 12/2006 Tzeng
2006/0291388 A1 12/2006 Amdahl
2006/0291480 A1 12/2006 Cho
2007/0036178 A1 2/2007 Hares
2007/0053294 A1 3/2007 Ho
2007/0061817 A1 3/2007 Atkinson
2007/0083625 A1 4/2007 Chamdani
2007/0086362 A1 4/2007 Kato
2007/0094464 A1 4/2007 Sharma
2007/0097968 A1 5/2007 Du
2007/0098006 A1 5/2007 Parry
2007/0116224 A1 5/2007 Burke
2007/0116422 A1 5/2007 Reynolds
2007/0121617 A1 5/2007 Kanekar
2007/0156659 A1 7/2007 Lim
2007/0177525 A1 8/2007 Wijnands
2007/0177597 A1 8/2007 Ju
2007/0183313 A1 8/2007 Narayanan
2007/0206762 A1 9/2007 Chandra
2007/0211712 A1 9/2007 Fitch
2007/0226214 A1 9/2007 Smits
2007/0230472 A1 10/2007 Jesuraj
2007/0258449 A1 11/2007 Bennett
2007/0274234 A1 11/2007 Kubota
2007/0289017 A1 12/2007 Copeland, III
2008/0052487 A1 2/2008 Akahane
2008/0056135 A1 3/2008 Lee
2008/0056300 A1 3/2008 Williams
2008/0065760 A1 3/2008 Damm
2008/0075078 A1 3/2008 Watanabe
2008/0080517 A1 4/2008 Roy
2008/0095160 A1 4/2008 Yadav
2008/0101386 A1 5/2008 Gray
2008/0112400 A1 5/2008 Dunbar et al.
2008/0133760 A1 6/2008 Berkvens
2008/0159260 A1 7/2008 Vobbilisetty
2008/0159277 A1 7/2008 Vobbilisetty
2008/0165705 A1 7/2008 Umayabashi
2008/0172492 A1 7/2008 Raghunath
2008/0181196 A1 7/2008 Regan
2008/0181243 A1 7/2008 Vobbilisetty
2008/0186968 A1 8/2008 Farinacci
2008/0186981 A1 8/2008 Seto
2008/0205377 A1 8/2008 Chao
2008/0219172 A1 9/2008 Mohan
2008/0225852 A1 9/2008 Raszuk
2008/0225853 A1 9/2008 Melman
2008/0228897 A1 9/2008 Ko
2008/0240129 A1 10/2008 Elmeleegy
2008/0253380 A1 10/2008 Cazares
2008/0267179 A1 10/2008 Lavigne
2008/0285458 A1 11/2008 Lysne
2008/0285555 A1 11/2008 Ogasahara
2008/0298248 A1 12/2008 Roeck
2008/0304498 A1 12/2008 Jorgensen
2008/0304519 A1 12/2008 Koenen
2008/0310342 A1 12/2008 Kruys
2009/0022069 A1 1/2009 Khan
2009/0037607 A1 2/2009 Farinacci
2009/0037977 A1 2/2009 Gai
2009/0041046 A1 2/2009 Hirata
2009/0042270 A1 2/2009 Dolly
2009/0044270 A1 2/2009 Shelly
2009/0067422 A1 3/2009 Poppe
2009/0067442 A1 3/2009 Killian
2009/0079560 A1 3/2009 Fries
2009/0080345 A1 3/2009 Gray

(56) References Cited

U.S. PATENT DOCUMENTS

2009/0083445 A1 3/2009 Ganga
2009/0092042 A1 4/2009 Yuhara
2009/0092043 A1 4/2009 Lapuh
2009/0106405 A1 4/2009 Mazarick
2009/0116381 A1 5/2009 Kanda
2009/0129384 A1 5/2009 Regan
2009/0129389 A1 5/2009 Halna DeFretay
2009/0138577 A1 5/2009 Casado
2009/0138752 A1 5/2009 Graham
2009/0161584 A1 6/2009 Guan
2009/0161670 A1 6/2009 Shepherd
2009/0168647 A1 7/2009 Holness
2009/0199177 A1 8/2009 Edwards
2009/0204965 A1 8/2009 Tanaka
2009/0213783 A1 8/2009 Moreton
2009/0222879 A1 9/2009 Kostal
2009/0225752 A1 9/2009 Mitsumori
2009/0232031 A1 9/2009 Vasseur
2009/0245137 A1 10/2009 Hares
2009/0245242 A1 10/2009 Carlson
2009/0246137 A1 10/2009 Hadida
2009/0252049 A1 10/2009 Ludwig
2009/0252061 A1 10/2009 Small
2009/0260083 A1 10/2009 Szeto
2009/0279558 A1 11/2009 Davis
2009/0279701 A1 11/2009 Moisand
2009/0292858 A1 11/2009 Lambeth
2009/0316721 A1 12/2009 Kanda
2009/0323698 A1 12/2009 LeFaucheur
2009/0323708 A1 12/2009 Ihle
2009/0327392 A1 12/2009 Tripathi
2009/0327462 A1 12/2009 Adams
2010/0027420 A1 2/2010 Smith
2010/0027429 A1 2/2010 Jorgens
2010/0046471 A1 2/2010 Hattori
2010/0054260 A1 3/2010 Pandey
2010/0061269 A1 3/2010 Banerjee
2010/0074175 A1 3/2010 Banks
2010/0085981 A1 4/2010 Gupta
2010/0097941 A1 4/2010 Carlson
2010/0103813 A1 4/2010 Allan
2010/0103939 A1 4/2010 Carlson
2010/0131636 A1 5/2010 Suri
2010/0158024 A1 6/2010 Sajassi
2010/0165877 A1 7/2010 Shukla
2010/0165995 A1 7/2010 Mehta
2010/0168467 A1 7/2010 Johnston
2010/0169467 A1 7/2010 Shukla
2010/0169948 A1 7/2010 Budko
2010/0182920 A1 7/2010 Matsuoka
2010/0189119 A1 7/2010 Sawada
2010/0192225 A1* 7/2010 Ma .................... G06F 17/30985 726/23
2010/0195489 A1 8/2010 Zhou
2010/0195529 A1 8/2010 Liu
2010/0214913 A1 8/2010 Kompella
2010/0215042 A1 8/2010 Sato
2010/0215049 A1 8/2010 Raza
2010/0220724 A1 9/2010 Rabie
2010/0226368 A1 9/2010 Mack-Crane
2010/0226381 A1 9/2010 Mehta
2010/0246388 A1 9/2010 Gupta
2010/0246580 A1 9/2010 Kaganoi
2010/0257263 A1 10/2010 Casado
2010/0258263 A1 10/2010 Douxchamps
2010/0265849 A1 10/2010 Harel
2010/0271960 A1 10/2010 Krygowski
2010/0272107 A1 10/2010 Papp
2010/0281106 A1 11/2010 Ashwood-Smith
2010/0284414 A1 11/2010 Agarwal
2010/0284418 A1 11/2010 Gray
2010/0287262 A1 11/2010 Elzur
2010/0287548 A1 11/2010 Zhou
2010/0290464 A1 11/2010 Assarpour
2010/0290472 A1 11/2010 Raman
2010/0290473 A1 11/2010 Enduri
2010/0299527 A1 11/2010 Arunan
2010/0303071 A1 12/2010 Kotalwar
2010/0303075 A1 12/2010 Tripathi
2010/0303083 A1 12/2010 Belanger
2010/0309820 A1 12/2010 Rajagopalan
2010/0309912 A1 12/2010 Mehta
2010/0316055 A1 12/2010 Belanger
2010/0329110 A1 12/2010 Rose
2010/0329265 A1 12/2010 Lapuh
2011/0019678 A1 1/2011 Mehta
2011/0032945 A1 2/2011 Mullooly
2011/0035489 A1 2/2011 McDaniel
2011/0035498 A1 2/2011 Shah
2011/0044339 A1 2/2011 Kotalwar
2011/0044352 A1 2/2011 Chaitou
2011/0051723 A1 3/2011 Rabie
2011/0058547 A1 3/2011 Waldrop
2011/0064086 A1 3/2011 Xiong
2011/0064089 A1 3/2011 Hidaka
2011/0072208 A1 3/2011 Gulati
2011/0085560 A1 4/2011 Chawla
2011/0085562 A1 4/2011 Bao
2011/0085563 A1 4/2011 Kotha
2011/0110266 A1 5/2011 Li
2011/0134802 A1 6/2011 Rajagopalan
2011/0134803 A1 6/2011 Dalvi
2011/0134924 A1 6/2011 Hewson
2011/0134925 A1 6/2011 Safrai
2011/0142053 A1 6/2011 VanDerMerwe
2011/0142062 A1 6/2011 Wang
2011/0161494 A1 6/2011 McDysan
2011/0161695 A1 6/2011 Okita
2011/0176412 A1 7/2011 Stine
2011/0188373 A1 8/2011 Saito
2011/0194403 A1 8/2011 Sajassi
2011/0194563 A1 8/2011 Shen
2011/0225540 A1 9/2011 d'Entremont
2011/0228780 A1 9/2011 Ashwood-Smith
2011/0231570 A1 9/2011 Altekar
2011/0231574 A1 9/2011 Saunderson
2011/0235523 A1 9/2011 Jha
2011/0243133 A9 10/2011 Villait
2011/0243136 A1 10/2011 Raman
2011/0246669 A1 10/2011 Kanada
2011/0255538 A1 10/2011 Srinivasan
2011/0255540 A1 10/2011 Mizrahi
2011/0261828 A1 10/2011 Smith
2011/0268120 A1 11/2011 Vobbilisetty
2011/0268125 A1 11/2011 Vobbilisetty
2011/0273988 A1 11/2011 Tourrilhes
2011/0274114 A1 11/2011 Dhar
2011/0280572 A1 11/2011 Vobbilisetty
2011/0286457 A1 11/2011 Ee
2011/0055274 A1 12/2011 Hegge
2011/0296052 A1 12/2011 Guo
2011/0299391 A1 12/2011 Vobbilisetty
2011/0299413 A1 12/2011 Chatwani
2011/0299414 A1 12/2011 Yu
2011/0299527 A1 12/2011 Yu
2011/0299528 A1 12/2011 Yu
2011/0299531 A1 12/2011 Yu
2011/0299532 A1 12/2011 Yu
2011/0299533 A1 12/2011 Yu
2011/0299534 A1 12/2011 Koganti
2011/0299535 A1 12/2011 Vobbilisetty
2011/0299536 A1 12/2011 Cheng
2011/0307500 A1* 12/2011 Li .......................... H04L 67/24 707/755
2011/0317559 A1 12/2011 Kern
2011/0317703 A1 12/2011 Dunbar et al.
2012/0011240 A1 1/2012 Hara
2012/0014261 A1 1/2012 Salam
2012/0014387 A1 1/2012 Dunbar
2012/0020220 A1 1/2012 Sugita
2012/0027017 A1 2/2012 Rai
2012/0033663 A1 2/2012 Guichard
2012/0033665 A1 2/2012 Jacob
2012/0033668 A1 2/2012 Humphries

(56) References Cited

U.S. PATENT DOCUMENTS

2012/0033669 A1 2/2012 Mohandas
2012/0033672 A1 2/2012 Page
2012/0039163 A1 2/2012 Nakajima
2012/0063363 A1 3/2012 Li
2012/0075991 A1 3/2012 Sugita
2012/0099567 A1 4/2012 Hart
2012/0099602 A1 4/2012 Nagapudi
2012/0106339 A1 5/2012 Mishra
2012/0117438 A1 5/2012 Shaffer
2012/0131097 A1 5/2012 Baykal
2012/0131289 A1 5/2012 Taguchi
2012/0134266 A1 5/2012 Roitshtein
2012/0136999 A1 5/2012 Roitshtein
2012/0147740 A1 6/2012 Nakash
2012/0158997 A1 6/2012 Hsu
2012/0163164 A1 6/2012 Terry
2012/0163224 A1* 6/2012 Long .................. H04L 41/5025 370/252
2012/0170491 A1 7/2012 Kern
2012/0177039 A1 7/2012 Berman
2012/0210416 A1 8/2012 Mihelich
2012/0230225 A1 9/2012 Matthews
2012/0243359 A1 9/2012 Keesara
2012/0243539 A1 9/2012 Keesara
2012/0250502 A1 10/2012 Brolin
2012/0275297 A1 11/2012 Subramanian
2012/0275347 A1 11/2012 Banerjee
2012/0278804 A1 11/2012 Narayanasamy
2012/0281700 A1 11/2012 Koganti
2012/0287785 A1 11/2012 Kamble
2012/0294192 A1 11/2012 Masood
2012/0294194 A1 11/2012 Balasubramanian
2012/0230800 A1 12/2012 Kamble
2012/0320800 A1 12/2012 Kamble
2012/0320926 A1 12/2012 Kamath et al.
2012/0327766 A1 12/2012 Tsai et al.
2012/0327937 A1 12/2012 Melman et al.
2013/0003535 A1 1/2013 Sarwar
2013/0003549 A1 1/2013 Matthews
2013/0003608 A1 1/2013 Lei
2013/0003737 A1 1/2013 Sinicrope
2013/0003738 A1 1/2013 Koganti
2013/0028072 A1 1/2013 Addanki
2013/0034015 A1 2/2013 Jaiswal
2013/0034021 A1 2/2013 Jaiswal
2013/0034094 A1 2/2013 Cardona
2013/0044629 A1 2/2013 Biswas
2013/0058354 A1 3/2013 Casado
2013/0067466 A1 3/2013 Combs
2013/0070762 A1 3/2013 Adams
2013/0083693 A1 4/2013 Himura
2013/0097345 A1 4/2013 Munoz
2013/0114595 A1 5/2013 Mack-Crane
2013/0124707 A1 5/2013 Ananthapadmanabha
2013/0124750 A1 5/2013 Anumala
2013/0127848 A1 5/2013 Joshi
2013/0136123 A1 5/2013 Ge
2013/0145008 A1 6/2013 Kannan
2013/0148546 A1 6/2013 Eisenhauer
2013/0148663 A1 6/2013 Xiong
2013/0194914 A1 8/2013 Agarwal
2013/0201992 A1 8/2013 Masaki
2013/0205002 A1* 8/2013 Wang ...................... H04L 69/16 709/224
2013/0219473 A1 8/2013 Schaefer
2013/0223221 A1 8/2013 Xu
2013/0250951 A1 9/2013 Koganti
2013/0250958 A1 9/2013 Watanabe
2013/0259037 A1 10/2013 Natarajan
2013/0272135 A1 10/2013 Leong
2013/0294451 A1 11/2013 Li
2013/0301425 A1 11/2013 Udutha et al.
2013/0301642 A1 11/2013 Radhakrishnan
2013/0315125 A1 11/2013 Ravishankar
2013/0322427 A1 12/2013 Stiekes
2013/0346583 A1 12/2013 Low
2014/0013324 A1 1/2014 Zhang
2014/0025736 A1 1/2014 Wang
2014/0029419 A1 1/2014 Jain
2014/0044126 A1 2/2014 Sabhanatarajan
2014/0056298 A1 2/2014 Vobbilisetty
2014/0059225 A1 2/2014 Gasparakis
2014/0071987 A1 3/2014 Janardhanan
2014/0086253 A1 3/2014 Yong
2014/0092738 A1 4/2014 Grandhi
2014/0105034 A1 4/2014 Huawei
2014/0112122 A1 4/2014 Kapadia
2014/0140243 A1 5/2014 Ashwood-Smith
2014/0169368 A1 6/2014 Grover
2014/0192804 A1 7/2014 Ghanwani
2014/0241147 A1 8/2014 Rajagopalan
2014/0258446 A1 9/2014 Bursell
2014/0269701 A1 9/2014 Kaushik
2014/0269720 A1 9/2014 Srinivasan
2014/0269733 A1 9/2014 Venkatesh
2014/0355477 A1 12/2014 Velayudhar et al.
2014/0362854 A1 12/2014 Addanki
2014/0362859 A1 12/2014 Addanki
2015/0009992 A1 1/2015 Zhang
2015/0010007 A1 1/2015 Matsuhira
2015/0016300 A1 1/2015 Devireddy
2015/0030031 A1 1/2015 Zhou
2015/0092593 A1 4/2015 Kompella
2015/0110111 A1 4/2015 Song
2015/0110487 A1 4/2015 Fenkes
2015/0117256 A1 4/2015 Sabaa
2015/0139234 A1 5/2015 Hu
2015/0143369 A1 5/2015 Zheng
2015/0172098 A1 6/2015 Agarwal
2015/0188753 A1 7/2015 Anumala
2016/0087885 A1 3/2016 Tripathi
2016/0139939 A1 5/2016 Bosch
2016/0182458 A1 6/2016 Shatzkamer
2016/0344640 A1 11/2016 Soderund et al.
2017/0026197 A1 1/2017 Venkatesh
2017/0097841 A1 4/2017 Chang

FOREIGN PATENT DOCUMENTS

CN 101064682 10/2007
CN 101459618 6/2009
CN 101471899 7/2009
CN 101548511 9/2009
CN 101645880 2/2010
CN 102098237 6/2011
CN 102148749 8/2011
CN 102301663 12/2011
CN 102349268 2/2012
CN 102378176 3/2012
CN 102404181 4/2012
CN 102415065 4/2012
CN 102415065 A 4/2012
CN 102801599 11/2012
CN 102801599 A 11/2012
CN 102088388 4/2014
EP 0579567 5/1993
EP 0579567 A2 1/1994
EP 0993156 4/2000
EP 0993156 A2 12/2000
EP 1398920 3/2004
EP 1398920 A2 3/2004
EP 1916807 A2 4/2008
EP 2001167 A1 10/2008
EP 2854352 4/2015
EP 2874359 5/2015
WO 2008056838 5/2008
WO 2009042919 4/2009
WO 2010111142 9/2010
WO 2010111142 A1 9/2010
WO 2011132568 10/2011
WO 2011140028 11/2011
WO 2011140028 A1 11/2011

(56) References Cited

FOREIGN PATENT DOCUMENTS

| | | |
|---|---|---|
| WO | 2012033663 | 3/2012 |
| WO | 2012093429 | 7/2012 |
| WO | 2014031781 | 2/2014 |

OTHER PUBLICATIONS

Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Office Action dated Jun. 18, 2015, U.S. Appl. No. 13/098,490, filed May 2, 2011.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004) pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'Fastlron and Turbolron 24x Configuration Guide', Feb. 16, 2010.
Brocade, 'The Effortless Network: Hyperedge Technology for the Campus LAN' 2012.
Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
Fastlron Configuration Guide Supporting Ironware Software Release 07.0.00, Dec. 18, 2009.
Foundary Fastlron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.

(56) References Cited

OTHER PUBLICATIONS

Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, , dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.

(56) References Cited

OTHER PUBLICATIONS

Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, ED K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.

(56) References Cited

OTHER PUBLICATIONS

Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.

* cited by examiner

NETWORK FEEDBACK IN SOFTWARE-DEFINED NETWORKS

RELATED APPLICATIONS

This application is a continuation application of application Ser. No. 13/890,150, titled "Network Feedback in Software-Defined Networks," by inventor Mani Prasad Kancherla, filed on 8 May 2013, which claims the benefit of U.S. Provisional Application No. 61/649,034, titled "Software Defined Networks," by inventor Mani Prasad Kancherla, filed 18 May 2012, the disclosures of which are incorporated by reference herein.

The present disclosure is related to U.S. patent application Ser. No. 13/669,313, titled "System and Method for Flow Management in Software-Defined Networks," by inventors Kashyap Tavarekere Ananthapadmanabha, Vivek Agarwal, and Eswara S. P. Chinthalapati, filed 5 Nov. 2012, the disclosure of which is incorporated by reference herein.

BACKGROUND

Field

The present disclosure relates to network management. More specifically, the present disclosure relates to a method and system for facilitating network feedback in a software-defined network.

Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as defining data flows using software, to move more traffic efficiently. However, the complexity of a switch cannot grow infinitely. It is limited by physical space, power consumption, and design complexity, to name a few factors. Furthermore, switches with higher and more versatile capability are usually more complex and expensive.

Software-defined flow is a new paradigm in data communication networks. Any network supporting software-defined flows can be referred to as software-defined network. An example of a software-defined network can be an OpenFlow network, wherein a network administrator can configure how a switch behaves based on flow definitions that can be defined across different layers of network protocols. A software-defined network separates the intelligence needed for controlling individual network devices (e.g., routers and switches) and offloads the control mechanism to a remote controller device (often a standalone server or end device). Therefore, a software-defined network provides complete control and flexibility in managing data flow in the network.

While support for software-defined flows brings many desirable features to networks, some issues remain unsolved in facilitating network feedback for generating and managing flow definitions in a software-defined network.

SUMMARY

One embodiment of the present invention provides a computing system capable of providing feedback to a controller in a software-defined network. The computing system includes a policy management module and a communication module coupled to the policy management module. During operation, the policy management module recognizes a local policy indicating how a data flow is to be processed and identifies a data flow associated with the policy. The communication module constructs a request for a flow definition from a controller in a software-defined network. A flow definition indicates how the data flow is processed in the software-defined network.

In a variation on this embodiment, the communication module identifies a packet as belonging to the data traffic flow. The policy management module then determines whether the packet matches the policy and instructs the communication module to construct the feedback message in response to the packet matching the policy.

In a variation on this embodiment, the software-defined network is an OpenFlow-enabled network.

In a variation on this embodiment, the computing system is an appliance providing a service to the software-defined network, and the policy is associated with the service.

In a variation on this embodiment, the computing system also includes a policy enforcement module coupled to the policy management module. The policy enforcement module marks the request as enforced, which indicates compulsory enforcement of the request.

In a further variation, the computing system also includes a scripting engine coupled to the policy enforcement module. The scripting engine receives a policy, which is in a format recognizable by the scripting engine.

In a further variation, the computing system also includes a control module which operates the computing system as a controller of the software-defined network.

BRIEF DESCRIPTION OF THE FIGURES

In the figures, like reference numerals refer to the same figure elements.

DETAILED DESCRIPTION

Figure 1A:
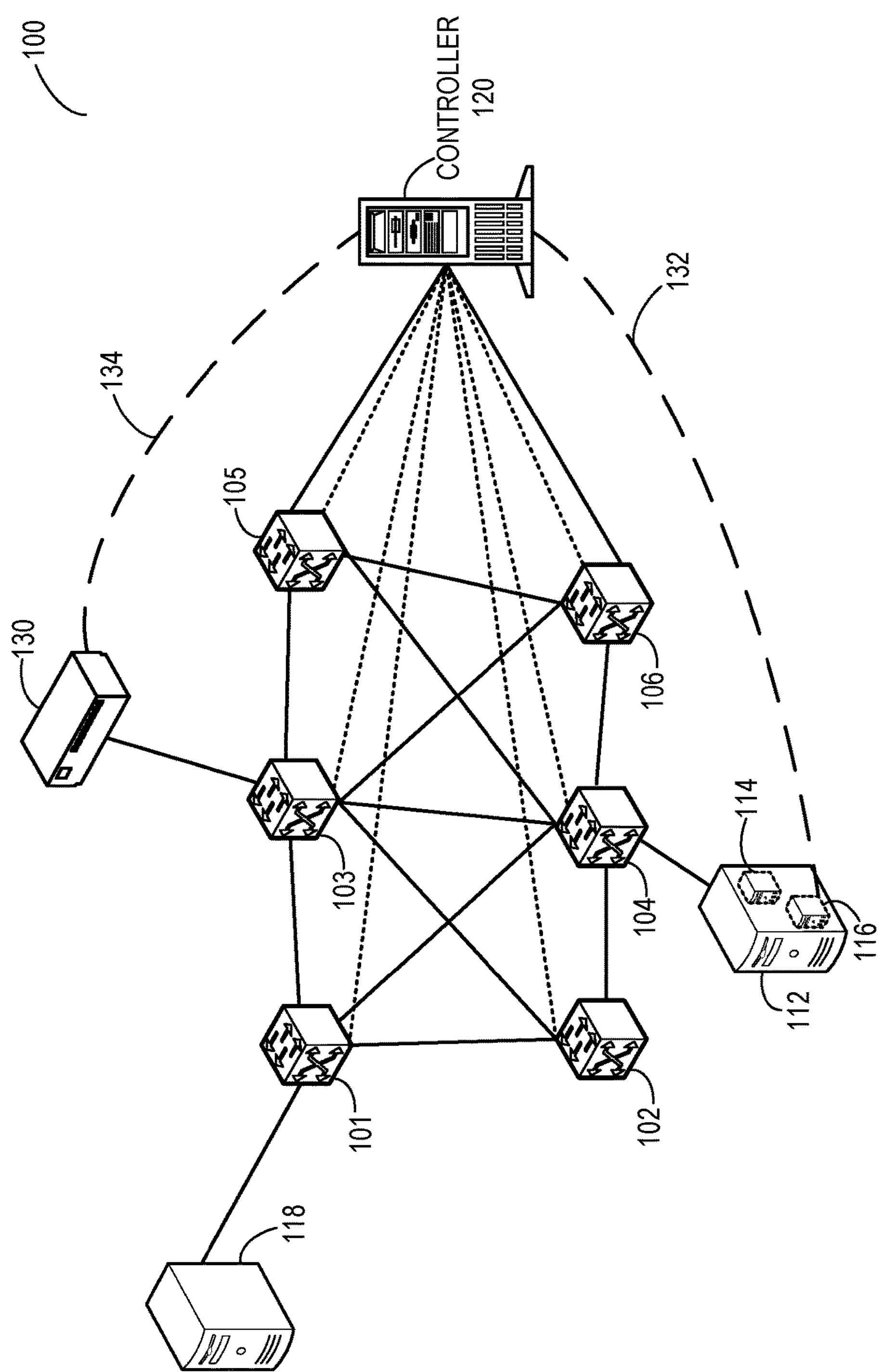
FIG. 1A illustrates an exemplary software-defined network with network feedback support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of generating flow definitions in a software-defined network based on network conditions and policy is solved by: (1) providing feedback regarding network conditions to a controller in the software-defined network, thereby allowing the controller to generate flow definitions based on the feedback; and (2) enforcing network policy on the controller by one or more intelligent networking devices.

A controller provides the forwarding intelligence (i.e., the control plane) in a software-defined network by generating flow definitions comprising rules and corresponding actions. The switches in the software-defined network are typically passive entities operating based on the flow definitions. It is often desirable to allow the controller to control the switches based on the condition of the software-defined network. Ideally, a controller, which is a standalone device, should provide flow definitions (such as those defined using OpenFlow) which can adapt to the network conditions. However, with the existing technologies, the controller typically generates flow definitions based on the local configurations and policies without making use of the information or status available in the software-defined network. Hence, a controller's effectiveness can be limited and may not capture the current conditions of the network.

The solutions described herein to the above problem are twofold. First, in a software-defined network, one or more intelligent networking devices, which are capable of making decisions regarding network conditions, can provide feedback to the controller regarding the current networking conditions. Such feedback is in a format recognizable and analyzable by the controller. Upon receiving the feedback, the controller analyzes the feedback and makes more intelligent decisions based on the network conditions indicated by the feedback. To support network feedback, the controller is also capable of receiving feedback messages from intelligent networking devices and generating flow definitions accordingly.

Second, in addition to allowing intelligent network devices to provide feedback, a controller can assist in enforcing specific configurations and policies. Many intelligent networking devices require the expression of complex network scenarios, which is often not possible via simple network feedback. In embodiments of the present invention, the intelligent networking devices implement local configurations or policies to capture intricate network conditions, especially involving complex scenarios, and enforce the controller to generate flow definitions reflecting the configurations and policies. In some embodiments, if an intelligent networking device has sufficient capability (e.g., processing and memory capacity), the device can operate as a controller, thereby eliminating the requirement for a separate device operating as the controller in the software-defined network.

In this disclosure, the term "software-defined network" refers to a network that facilitates control over a respective data flow by specifying the action associated with the flow in a flow definition. A controller, which can be a server, coupled to the software-defined network provides a respective switch in the software-defined network with the flow definitions. A flow definition can include a priority value, a rule that specifies a flow, and an action (e.g., a forwarding port or "drop") for the flow. The rule of a flow definition can specify, for example, any value combination in the ten-tuple of {in-port, virtual local area network (VLAN) identifier, media access control (MAC) source and destination addresses, Ethertype, Internet Protocol (IP) source and destination addresses, Internet Protocol, Transmission Control Protocol (TCP) source and destination ports}. Other packet header fields can also be included in the flow rule. Depending on its specificity, a flow rule can correspond to one or more flows in the network. Upon matching a respective packet to a rule, the switch in the software-defined network takes the action included in the corresponding flow definition. An example of a software-defined network includes, but is not limited to, OpenFlow, as described in Open Networking Foundation (ONF) specification "OpenFlow Switch Specification," available at http://www.openflow.org/documents/openflow-spec-v1.1.0.pdf, which is incorporated by reference herein.

In this disclosure, a switch in a software-defined network and capable of processing software-defined flows is referred to as a "software-definable" switch. Such a software-definable switch can include both ports that process software-defined flows and ports reserved for conventional packet forwarding (e.g., layer-2/Ethernet switching, or IP routing), which are referred to as "regular ports" in this disclosure. A flow definition typically includes one or more software-definable in-ports to which the definition is applicable. Any flow arriving via any port can potentially be a match for the generic flow definition.

The term "policy" is used in a generic sense, and can refer to any operation or group of operations providing specific action to a data flow associated with any network layer. Any action associated with the decision making of a networking device for a data flow can be referred to as a "policy." The term "intelligent networking device" is also used in a generic sense, and can refer to any device in a network capable of making decisions, perceiving network conditions, and/or implementing a policy. An "intelligent networking device" can be a device separate from a switch, or a hardware or software module running in the switch. An "intelligent networking device" capable of providing a service (i.e., a specific functionality required by a network) can also be referred to as an appliance. In this disclosure, the terms "intelligent networking device" and "appliance" are used interchangeably.

In some embodiments, the software-defined network is a fabric switch and a respective switch in the software-defined network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to the end device.

Although the present disclosure is presented using examples based on OpenFlow, embodiments of the present invention are not limited to networks defined using OpenFlow or a particular Open System Interconnection Reference Model (OSI reference model) layer. In this disclosure, the term "software-defined network" is used in a generic sense, and can refer to any network which facilitates switching of data flows based on software-defined rules by a controller. The term "flow definition" is also used in a generic sense, and can refer to any rule which identifies a data frame belonging to a specific flow and/or dictates how a switch should process the frame.

The term "end device" can refer to a host, a conventional layer-2 switch, or any other type of network device. Additionally, an end device can be coupled to other switches or hosts further away from a network. An end device can also be an aggregation point for a number of network devices to enter the network.

The term "message" refers to a group of bits that can be transported together across a network. "Message" should not be interpreted as limiting embodiments of the present invention to any specific networking layer. "Message" can be replaced by other terminologies referring to a group of bits, such as "frame," "packet," "cell," or "datagram." The term "frame" is used in a generic sense and should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "switch" include, but are not limited to, a layer-2 switch, a layer-3 router, a Transparent Interconnection of Lots of Links (TRILL) Routing Bridge (RBridge), an FC router, or an FC switch.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary software-defined network with network feedback support, in accordance with an embodiment of the present invention. A software-defined network 100 includes software-definable switches 101, 102, 103, 104, 105, and 106, which are capable of processing software-defined flows. Controller 120 is logically coupled to all software-definable switches in network 100. The logical connection between controller 120 and a respective switch in network 100 can include one or more physical links. End devices 112 and 118 are coupled to switches 104 and 101, respectively. End device 112 can be a physical host machine running virtual machines 114 and 116. Intelligent networking device 130 is coupled to switch 103. In some embodiments, device 130 is an appliance providing a service (e.g., firewall protection, load balancing, intrusion detection/protection, network/device virtualization, etc.) to network 100.

In some embodiments, virtual machine 116 operates as a virtual security device with necessary intelligence to detect specific network conditions, such as a security attack on network 100. During operation, virtual machine 116 detects an attack on one or more switches in network 100. However, because virtual machine 116 is a virtual device, and shares physical resources with other virtual machines, such as virtual machine 114, virtual machine 116 does not have enough capacity (e.g., processing and/or memory requirements) to protect the entire network against the attack. Furthermore, virtual machine 116 does not have a global view of network 100. For example, virtual machine 116 is unaware of device 130.

To solve this problem, upon detecting an attack, virtual machine 116 constructs a feedback message comprising the detected attack and sends the message to controller 120. This feedback message is in a format known to controller 120. Virtual machine 116 can establish a logical connection 132 with controller 120 via one or more physical links to exchange information. In some embodiments, controller 120 includes a software/hardware module capable of receiving and processing feedback from networking devices, thereby allowing the controller to make more intelligent decisions and address the issues indicated by the feedback. Controller 120 receives the feedback message and recognizes the current network condition (e.g., recognizes the detected attack). Controller 120 then generates one or more flow definitions to counter the attack and distributes the flow definitions to switches associated with the attack.

For example, if virtual machine 116 detects an attack from end device 118, virtual machine 116 includes this information in the feedback message. As a result, controller 120 is also aware of the association of the detected attack from end device 118. Controller 120, in response, distributes the flow definitions countering the attack to switch 101. Switch 101 uses a data structure (e.g., a linked-list) to store the flow definitions and incorporate the flow definitions in lookup information in hardware (e.g., in a content addressable memory or CAM). Examples of such a flow definition can include, but are not limited to, dropping all traffic received from an IP address associated with the detected attack (in this example, IP address of end device 118), redirection of a specific class of traffic for further inspection, forwarding potentially harmful traffic to a screening or filtering device, and any combination of these actions.

In addition to virtual machine 116, controller 120 can receive feedback from device 130. Device 130 can establish a logical connection 134 with controller 120 via one or more physical links to exchange information. Because virtual machine 116 and device 130 provide feedback to controller 120 independently, the feedback is not coordinated. For example, controller 120 can receive two interrelated feedback messages from virtual machine 116 and device 130 at different point of time. These feedback messages can affect the generation of flow definitions reflecting the same policy. Hence, controller 120 can make the final decision whether to generate a flow definition based on one particular feedback message. Upon receiving the feedback message from virtual machine 116, controller 120 can wait for a period of time to receive feedback messages from other networking devices, namely device 130. Once controller 120 receives feedback messages from both virtual machine 116 and device 130, controller 120 processes the feedback and decides whether to generate a flow definition. Note that the feedback from virtual machine 116 and device 130 can correspond to related (i.e., interdependent) or unrelated events.

Intelligent networking devices, such as device 130, are often expensive. For example, with the existing technologies, the per-port cost of device 130 can be significantly higher than a standard switch, such as switches 101 and 105. Typically, the greater the traffic flows passing through device 130, the greater the incurred cost. For example, a large number of traffic flows passing through device 130 requires device 130 to be equipped with a large number of expensive processor and more memory. As a result, offloading flows from expensive devices, such as device 130, to relatively less expensive switches, such as switches 101 and 105, can lead to significant cost savings.

Figure 1B:
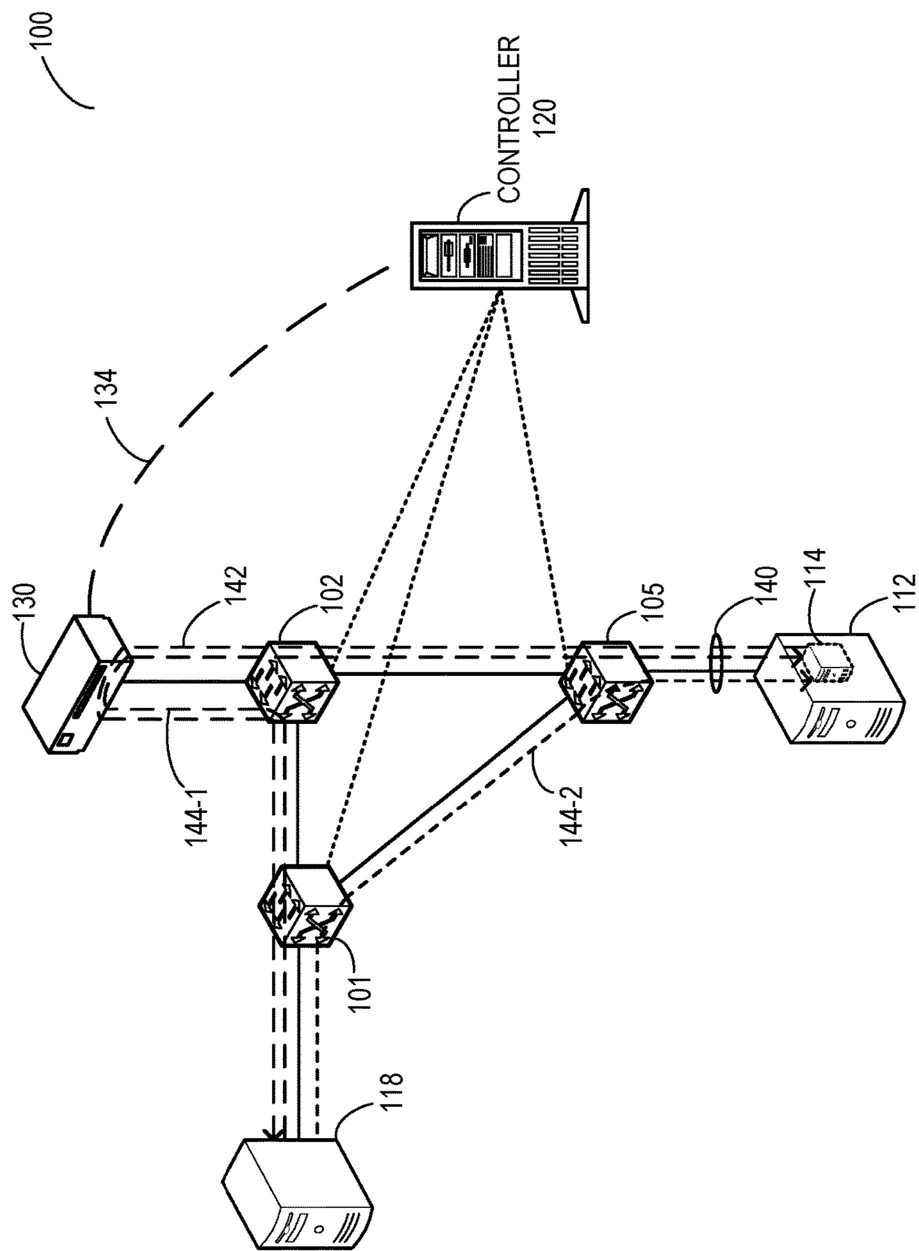
FIG. 1B illustrates a data flow offloading in a software-defined network in conjunction with the example in FIG. 1A, in accordance with an embodiment of the present invention.

FIG. 1B illustrates a data flow offloading in a software-defined network in conjunction with the example in FIG. 1A, in accordance with an embodiment of the present invention. During operation, virtual machine 114 in end device 112 initiates a bidirectional data communication 140 with end device 118. In this example, end device 118 can be a data server. Upstream data flow path 142 and downstream data flow path 144-1 of data communication 140 pass through device 130 to receive specific services provided by device 130. Offloading downstream flow path 144-1 from expensive device 130 to relatively less expensive switches 101 and 105 can lead to significant cost savings.

With existing technologies, network 100 can allow intelligent networking devices, such as device 130, to operate only on the traffic of the upstream flow. For example, if device 130 is a load balancing appliance, network 100 allows device 130 to load balance the traffic in network 100 by inspecting only the traffic of upstream flow path 142. However, though offloading data traffic from device 130 can offer significant cost savings, inspecting traffic from only upstream flow path 142 can lead to some limitations. By not inspecting the traffic from downstream flow path 144-1, device 130 cannot perform content-based load balancing (which typically requires inspection of parts of downstream flow 144-1 as well) or implement advanced security features, such as "SYN attack" protection. For example, if end device 118 is a video server, traffic of downstream flow path 144-1 comprises the streaming video toward virtual machine 114. Content-based load balancing can be performed only by inspecting parts of downstream flow path 144-1. Hence, with existing technologies, attaining cost savings via offloading all downstream traffic restricts the services that can be provided to network 100.

To solve this problem, device 130 provides feedback to controller 120 for partially or fully offloading selective downstream flow. For example, device 130 first inspects a few packets of the downstream traffic and provides services associated with downstream traffic. Afterward, if the traffic of downstream flow path 144-1 is bandwidth intensive (e.g., video streaming or large file sharing), device 130 can construct a feedback message requesting controller 120 to generate flow definitions for offloading traffic from device 130. Device 130 can identify the traffic of downstream flow path 144-1 as bandwidth intensive by identifying the port number associated with the flow path (e.g., all video streaming corresponding to port number 8080) or examining the header of the data packets belonging to the traffic of downstream flow path 144-1. After device 130 has identified downstream flow path 144-1 as a candidate for offloading, device 130 creates a corresponding feedback message. In some embodiments, the feedback message identifies downstream flow path 144-1 and can comprise one or more desired actions (e.g., network address translation or NAT) to be performed on the traffic of downstream flow path 144-1.

Upon receiving the feedback message, controller 120 detects downstream flow path 144-1 to be a candidate for offloading. In some embodiments, controller 120 further identifies a more suitable path for data communication 140 between virtual machine 114 and end device 118. Examples of a more suitable path can include, but are not limited to, a data path with a shorter distance, a fewer number of hops, lower congestion, higher/lower utilization, and lower delay. In the example in FIG. 1B, a most suitable path for downstream flow path 144-1 can be a path via switches 101 and 105, bypassing switch 102. Controller 120 generates a flow definition instructing switch 101 to forward traffic toward switch 105 via downstream flow path 144-2, which is the offloaded downstream flow path corresponding to downstream flow path 144-1. Controller 120 may generate another flow definition instructing switch 105 to forward traffic toward end device 112 via downstream flow path 144-2. Controller 120 sends these flow definitions to switches 101 and 105, respectively. Consequently, switches 101 and 105 offload traffic from device 130 and redirect the traffic via downstream flow path 144-2. Though the example in FIG. 1B describes offloading of downstream data flow path 144-1, based on network feedback, controller 120 can generate flow definitions, if needed, for offloading upstream data flow path 142, or both upstream data flow path 142 and downstream data flow path 144-1.

Offloading traffic from intelligent networking devices can allow deployment of a plurality of smaller and less expensive intelligent networking devices, instead of an expensive and high-capability device, to provide a service in a distributed way. For example, if intelligent networking device 130 is a firewall, device 130 can leverage flow offloading. Offloading bandwidth intensive data flows from device 130 provides high scalability. Under such a scenario, intelligent, but lower capacity firewalls can be more suitable for network 100 than less intelligent, but higher throughput firewalls. As a result, the feedback mechanism and the intelligence of device 130 allows network 100 to receive a service without requiring an expensive and high-capacity device.

Because device 130 does not inspect the traffic of downstream flow path 144-2, the control messages of downstream flow path 144-2 also bypass device 130. However, switches 101 and 105 need to remove the corresponding flow definition entries upon termination of data communication 140. Furthermore, device 130 needs to clear the states associated with data communication 140. Hence, device 130 needs to receive the control messages to be aware of the current state of data communication 140. To achieve this, when device 130 sends the feedback message to controller 120, device 130 can indicate that only the data packets (i.e., not the control packets) of data communication 140 require offloading from device 130. As a result, downstream data packets follow downstream flow path 144-2 while downstream control packets follow downstream flow path 144-1.

When device 130 detects the termination of data communication 140, device 130 constructs a notification message indicating the termination of data communication 140. Device 130 sends the message to controller 120. Controller 120 then generates instruction messages for switches 101, and 105, comprising instructions for removing the flow definitions associated with data communication 140. For example, when switch 101 receives the instruction message, switch 101 removes the flow definitions associated with flow paths 142, 144-1, and 144-2. By inspecting the control messages, device 130 can facilitate other services, exception handling (e.g., a server failure), during an ongoing communication.

Network Feedback

Figure 2A:
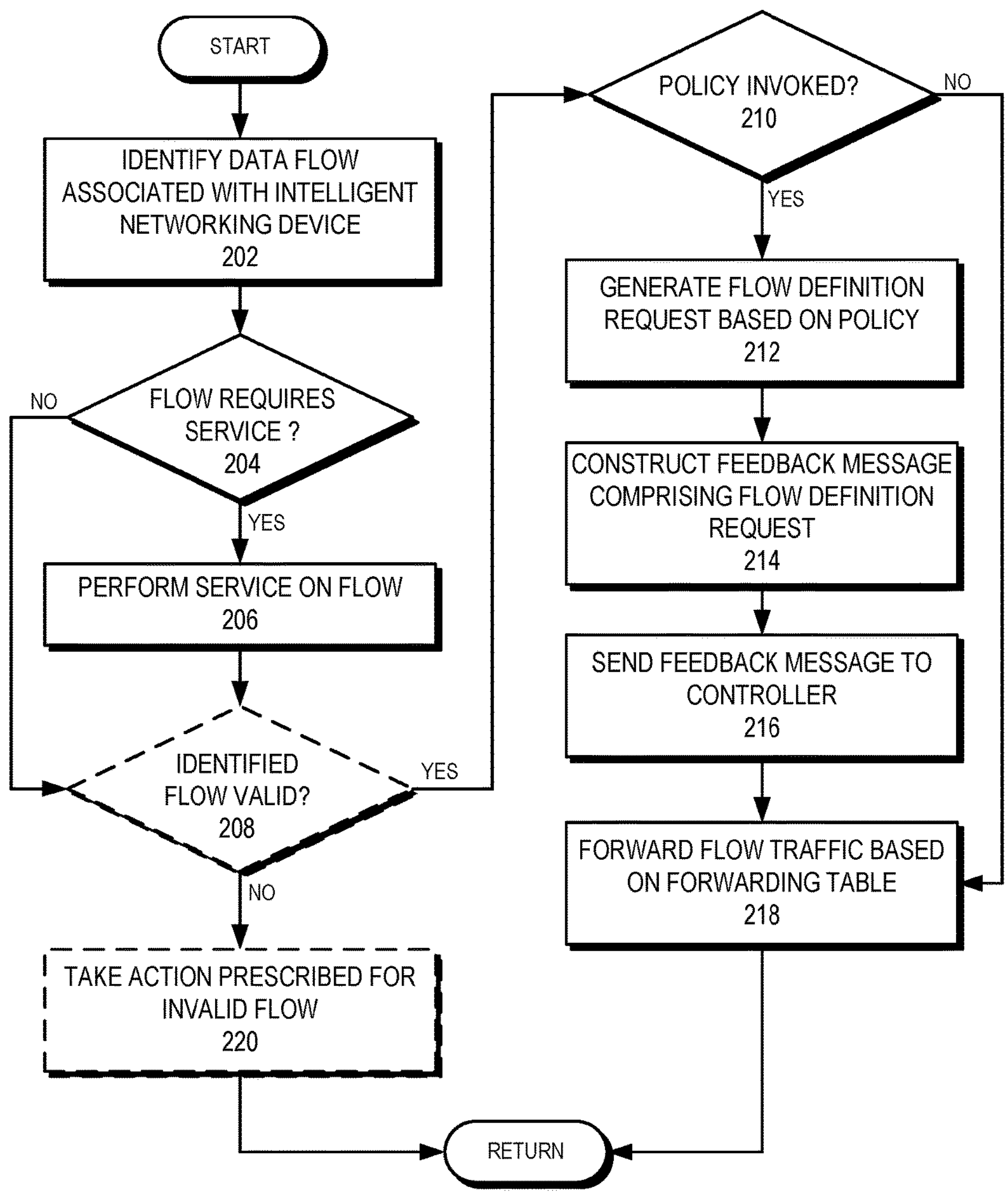
FIG. 2A presents a flowchart illustrating the process of an intelligent networking device providing feedback to a controller in a software-defined network, in accordance with an embodiment of the present invention.

In the example in FIG. 1B, intelligent networking device 130 provides feedback to controller 120. Upon receiving the feedback, controller 120 generates flow definitions based on the feedback. FIG. 2A presents a flowchart illustrating the process of an intelligent networking device providing feedback to a controller in a software-defined network, in accordance with an embodiment of the present invention. The device first identifies a data flow associated with the device (operation 202) and checks whether the flow requires a service offered by the device (operation 204). Note that the device may not provide any service.

If the flow requires a service offered by the device, the device performs the service on the data flow (operation 206). For example, if the device is a firewall, in operation 206, the device checks whether the data flow is permitted to continue. The device can optionally check whether the flow is a valid flow based on the service (operation 208). Some services, such as load balancing, do not require a validity check. If the identified flow is invalid, the device takes action prescribed for the invalid flow (operation 220). For example, if the device is an intrusion protection device, the device checks validity of the flow by checking whether the flow is an intrusive flow. If so, the prescribed action can be dropping the intrusive flow.

If the identified flow is valid, the device checks whether a policy is invoked for the flow (operation 210). For example, if the data flow is a video stream, the policy for the data flow can be offloading of the data flow from the device, as described in conjunction with FIG. 1B. If a policy is invoked, the device generates a request for a flow definition based on the policy (operation 212) and constructs a feedback message comprising the request (operation 214). The device then sends the feedback message to a controller of the software-defined network (operation 216). This feedback message can be in a format recognizable and analyzable by the controller. If a policy is not invoked (operation 210) or after sending the message to controller (operation 216), the device forwards the flow traffic based on its forwarding tables (operation 218).

Figure 2B:
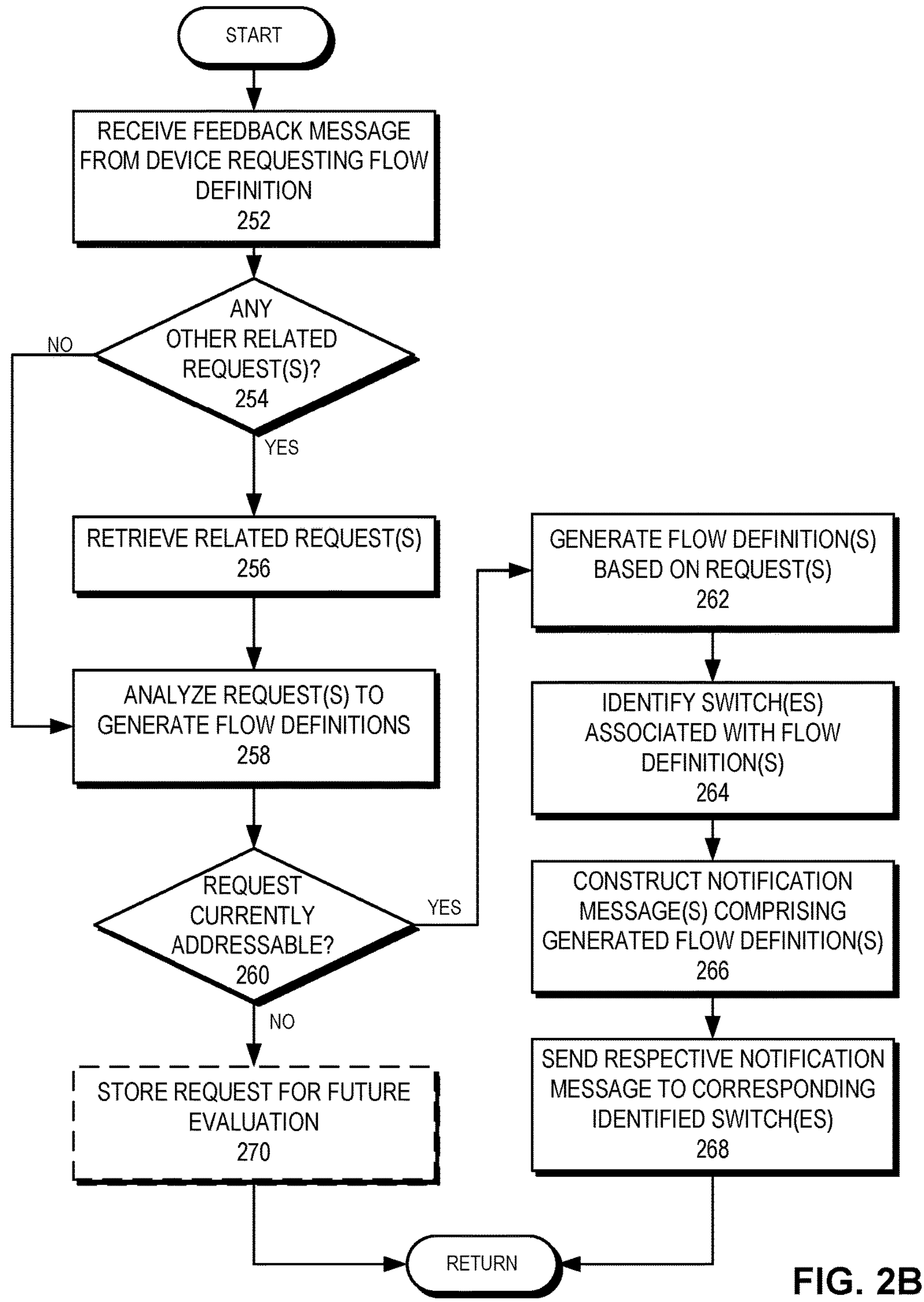
FIG. 2B presents a flowchart illustrating the process of a controller in a software-defined network generating flow definitions based on a feedback from an intelligent networking device, in accordance with an embodiment of the present invention.

FIG. 2B presents a flowchart illustrating the process of a controller in a software-defined network generating flow definitions based on a feedback from an intelligent networking device, in accordance with an embodiment of the present invention. Upon receiving a feedback message from an intelligent networking device requesting a flow definition (operation 252), the controller checks whether the controller has any other related request(s) (operation 254). This operation ensures that the controller considers all interrelated requests to generate flow definitions, as described in conjunction with FIG. 1A. If the controller has any other related requests, the controller retrieves the related request(s) (operation 256). If the controller does not have any other related request(s) (operation 254) or after retrieving the request(s) (operation 256), the controller analyzes the request(s) to generate flow definitions (operation 258).

The controller then checks whether the request is currently addressable (operation 260). Because the controller has a global view of the network, the controller can decide whether a request from a device can be addressable. For example, if the request is for changing the path of a data flow and the changed flow path diverts traffic from another device providing an essential service to the flow, the controller can deem the request to be unaddressable. If the request is not currently addressable, the controller can optionally store the request for future evaluation (operation 270). Otherwise, the controller generates one or more flow definitions based on the request(s) (operation 262). The controller identifies the switch(es) associated with the flow definition(s) (operation 264), constructs notification message(s) comprising the flow definition(s) (operation 266), and sends a respective notification message to the corresponding identified switch(es) (operation 268).

Policy Enforcement

Figure 3:
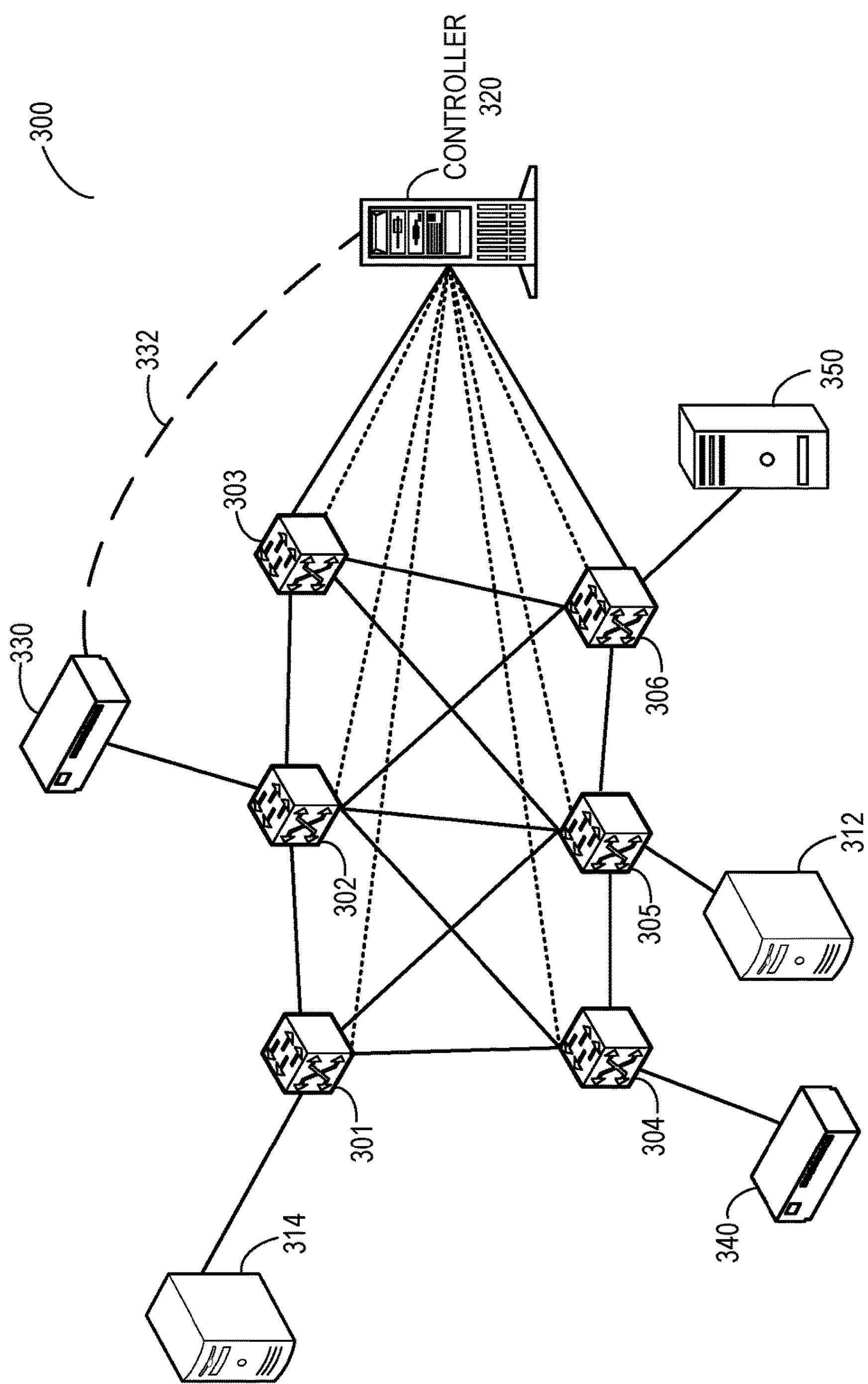
FIG. 3 illustrates an exemplary software-defined network with policy-enforcement via an intelligent networking device, in accordance with an embodiment of the present invention.

In the example in FIG. 1B, intelligent networking device 130 can request controller 120 to generate a flow definition. However, the enforcement point of the request is controller 120, wherein controller 120 decides whether to address the request. However, device 130 in software-defined network 100 can also operate as the enforcement point for network policies, wherein device 130 can enforce controller 120 to generate a flow definition. FIG. 3 illustrates an exemplary software-defined network with policy-enforcement via an intelligent networking device, in accordance with an embodiment of the present invention.

A software-defined network 300 includes software-definable switches 301, 302, 303, 304, 305, and 306, which are capable of processing software-defined flows. Controller 320 is logically coupled to all software-definable switches in network 300. The logical connection between controller 320 and a respective switch in network 300 can include one or more physical links. End devices 312 and 314 are coupled to switches 305 and 301, respectively. Intelligent networking devices 330 and 340 are coupled to switches 302 and 304, respectively. In some embodiments, one or both of devices 330 and 340 are appliances providing a service (e.g., firewall protection, load balancing, intrusion detection/protection, network/device virtualization, etc.) to network 300.

In some embodiments, device 330 can operate as the point of policy enforcement. Device 330 allows a network administrator to express one or more policies in a flexible way. Based on these policies, device 330 explicitly enforces controller 320 to generate one or more flow definitions. Device 330 can establish a logical connection 332 with controller 320 via one or more physical links to exchange information. Note that, though network 300 includes a plurality of intelligent networking devices, not all devices need to be the point of enforcement. For example, network 300 includes devices 330 and 340. However, device 340 does not operate as a point of enforcement and operates as a regular intelligent networking device in a software-defined network, such as device 130 in the example in FIG. 1B.

In the example in FIG. 3, the network administrator can express a specific policy to device 330. For example, the policy can instruct device 330 to monitor all accesses to a specific e-mail account. Since a user can access the e-mail account from any location with Internet access, any traffic accessing the e-mail account requires monitoring. Device 330 can maintain states for a respective access. With the existing technologies, this level of intensive and large-scale inspection is beyond the scope of a typical controller 320. Hence, device 330 is more suitable for such policy enforcement than controller 320. In some embodiments, the network administrator uses an application scripting engine (e.g., OpenScript) to express the policy.

If device 330 detects any access to the malicious e-mail account from an IP address, it can be desirable to monitor all activities associated with that IP address (e.g., which other e-mail accounts or services are accessed from that IP address). However, other traffic from that IP address may not pass through device 330. Moreover, device 330 may not be able to facilitate such additional monitoring. As a result, an additional network-level policy is needed to monitor all traffic from that IP address. To facilitate network-wide monitoring, device 330 enforces controller 320 to generate one or more flow definitions for the switches in network 300 to provide such monitoring.

Suppose that device 330 detects a policy match (e.g., malicious access to an e-mail account from a malicious IP address) for a flow from end device 314. As a result, device 330 invokes a second policy (e.g., monitor all traffic from the malicious IP address). Device 330 instructs controller 320 to generate flow definitions corresponding to this second policy. Upon receiving the instruction, controller 320 generates the flow definitions and sends the flow definitions to one or more corresponding switches in network 300. In some embodiments, network 300 can further include a monitoring device 350. The flow definitions corresponding to the second policy can specify a respective switch to forward all traffic associated with the malicious IP address to monitoring device 350. As a result, if switch 305 detects a data flow from the malicious IP address, switch 305 forwards the flow to switch 306, which in turn forwards the flow to monitoring device 350. Monitoring device 350 can examine the received flow and collect information about all the malicious activity.

Figure 4A:
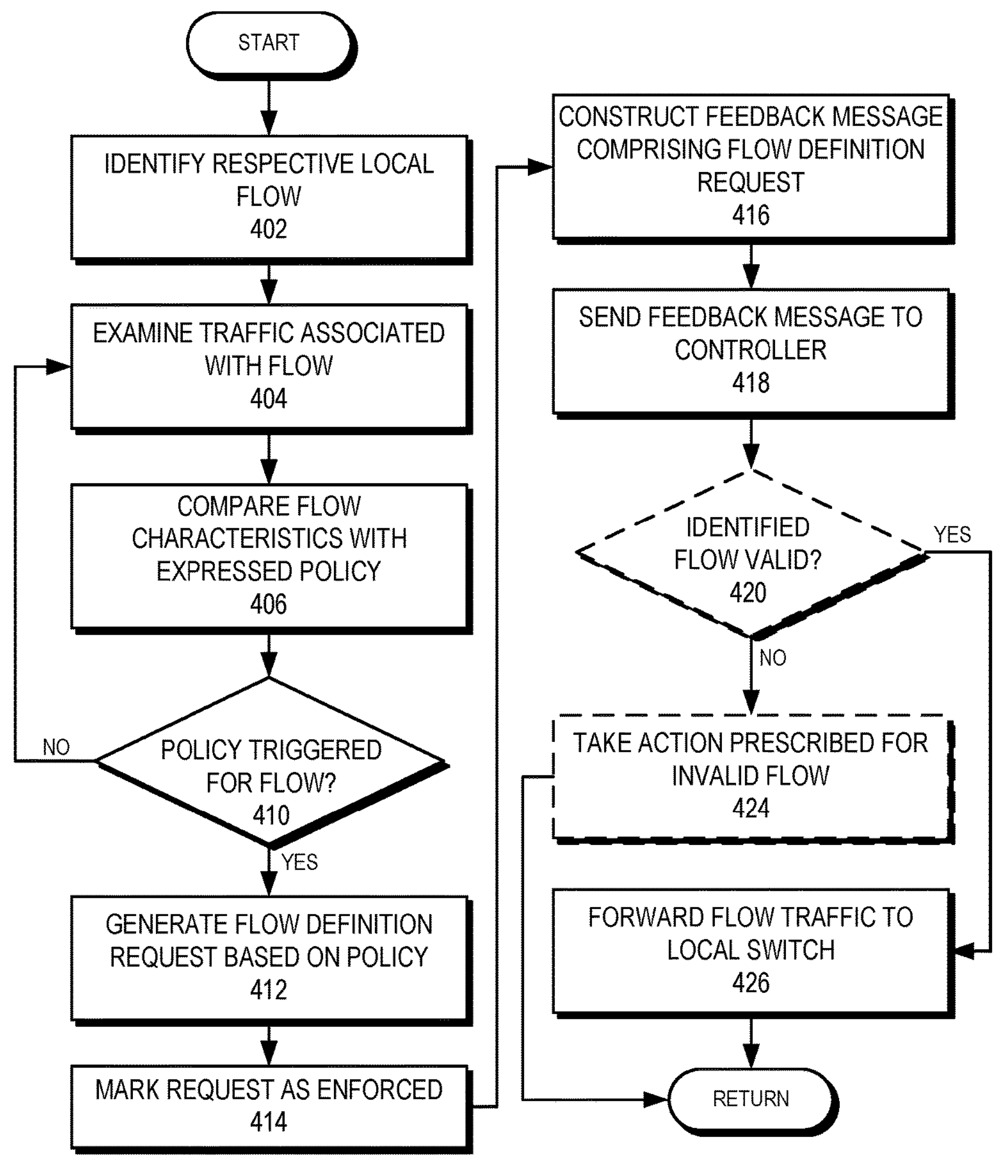
FIG. 4A presents a flowchart illustrating the process of an intelligent networking device providing policy-enforced feedback to a controller in a software-defined network, in accordance with an embodiment of the present invention.

FIG. 4A presents a flowchart illustrating the process of an intelligent networking device providing policy-enforced feedback to a controller in a software-defined network, in accordance with an embodiment of the present invention. The device identifies a respective local flow (operation 402). The device then examines the received data traffic associated with the flow (operation 404) and compares the flow characteristics with an expressed enforced policy (operation 406). This policy can be expressed by a network administrator using an application scripting engine. The device checks whether a policy, which can be a different policy than the expressed policy, has been triggered for the flow (operation 410), as described in conjunction with FIG. 3.

If no policy has been triggered, the device continues to examine the traffic (operation 404). Otherwise, the device generates a request for a flow definition based on the triggered policy (operation 412) and marks the request as "enforced" (operation 414). The device then constructs a feedback message comprising the request (operation 416) and sends the feedback message to a controller of the software-defined network (operation 418). In this way, the controller recognizes the request to be from a point of enforcement. In some embodiments, the device marks the feedback message as "enforced." The device can optionally check whether the flow is a valid flow based on a service provided by the device (operation 420). If the identified flow is invalid, the device takes action prescribed for the invalid flow (operation 424). If the identified flow is valid, the device forwards the flow traffic to the local switch from which the flow traffic is received (operation 426). Note that the device can also provide non-enforced feedback to the controller, as described in conjunction with FIG. 2A.

Figure 4B:
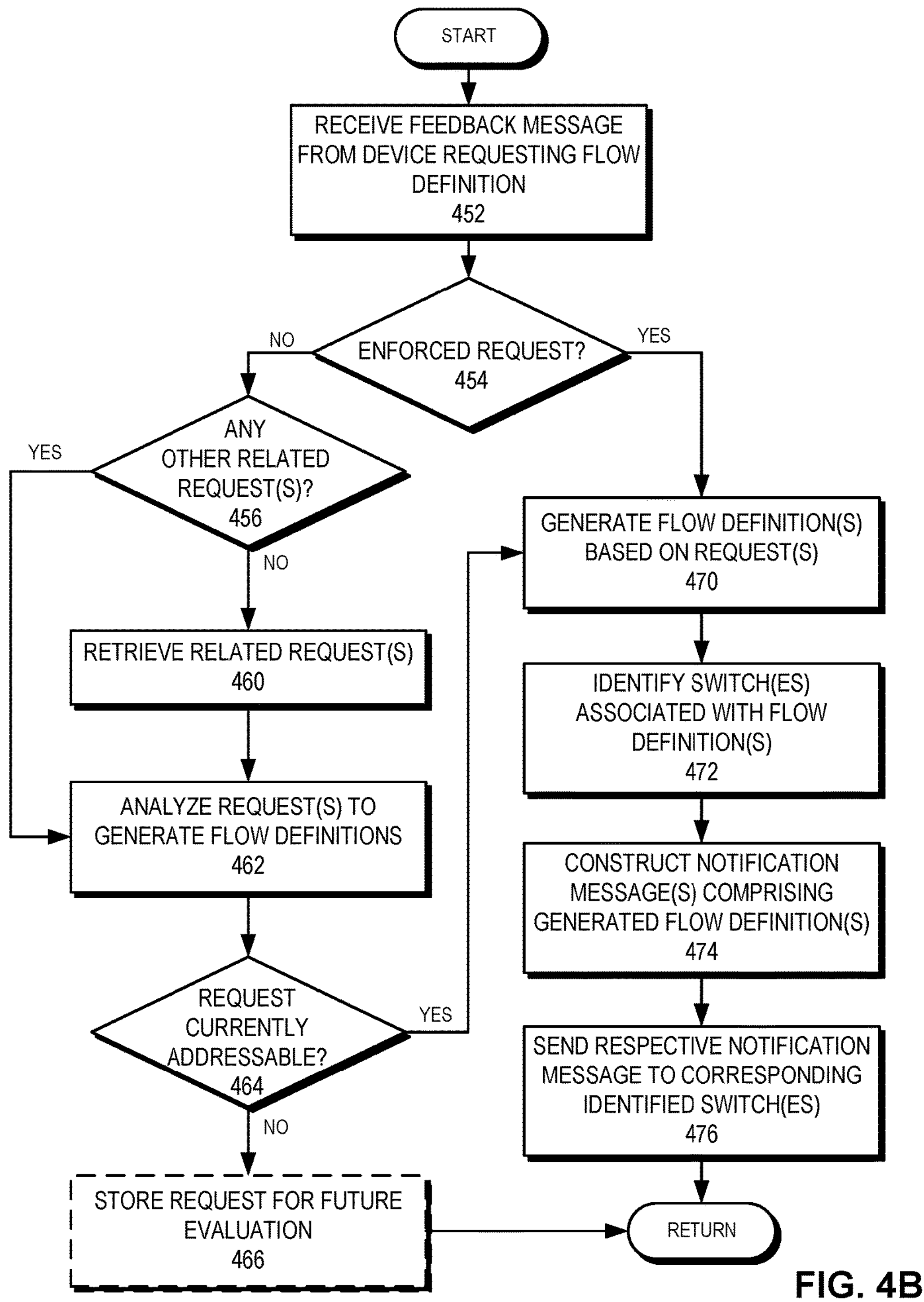
FIG. 4B presents a flowchart illustrating the process of a controller in a software-defined network generating flow definitions based on a policy-enforced feedback from an intelligent networking device, in accordance with an embodiment of the present invention.

FIG. 4B presents a flowchart illustrating the process of a controller in a software-defined network generating flow definitions based on a policy-enforced feedback from an intelligent networking device, in accordance with an embodiment of the present invention. Upon receiving a feedback message from an intelligent networking device requesting a flow definition (operation 452), the controller checks whether the request is enforced (operation 454). Either the received feedback message or the request can indicate the enforcement. If the request is not enforced, the controller checks whether the controller has any other related request(s) (operation 456). If the controller has any other related request(s), the controller retrieves the related request(s) (operation 460). If the controller does not have any other related request(s) (operation 456) or after retrieving the request(s) (operation 460), the controller analyzes the request(s) to generate flow definitions (operation 462).

The controller then checks whether the request is currently addressable (operation 464). If the request is not currently addressable, the controller can optionally store the request for future evaluation (operation 466). If the request is enforced (operation 454) or the request is currently addressable (operation 464), the controller generates one or more flow definitions based on the request(s) (operation 470). The controller identifies the switch(es) associated with the flow definition(s) (operation 472), constructs notification message(s) comprising the flow definition(s) (operation 474), and sends a respective notification message to the corresponding identified switch(es) (operation 476).

Integrated Controller

Figure 5:
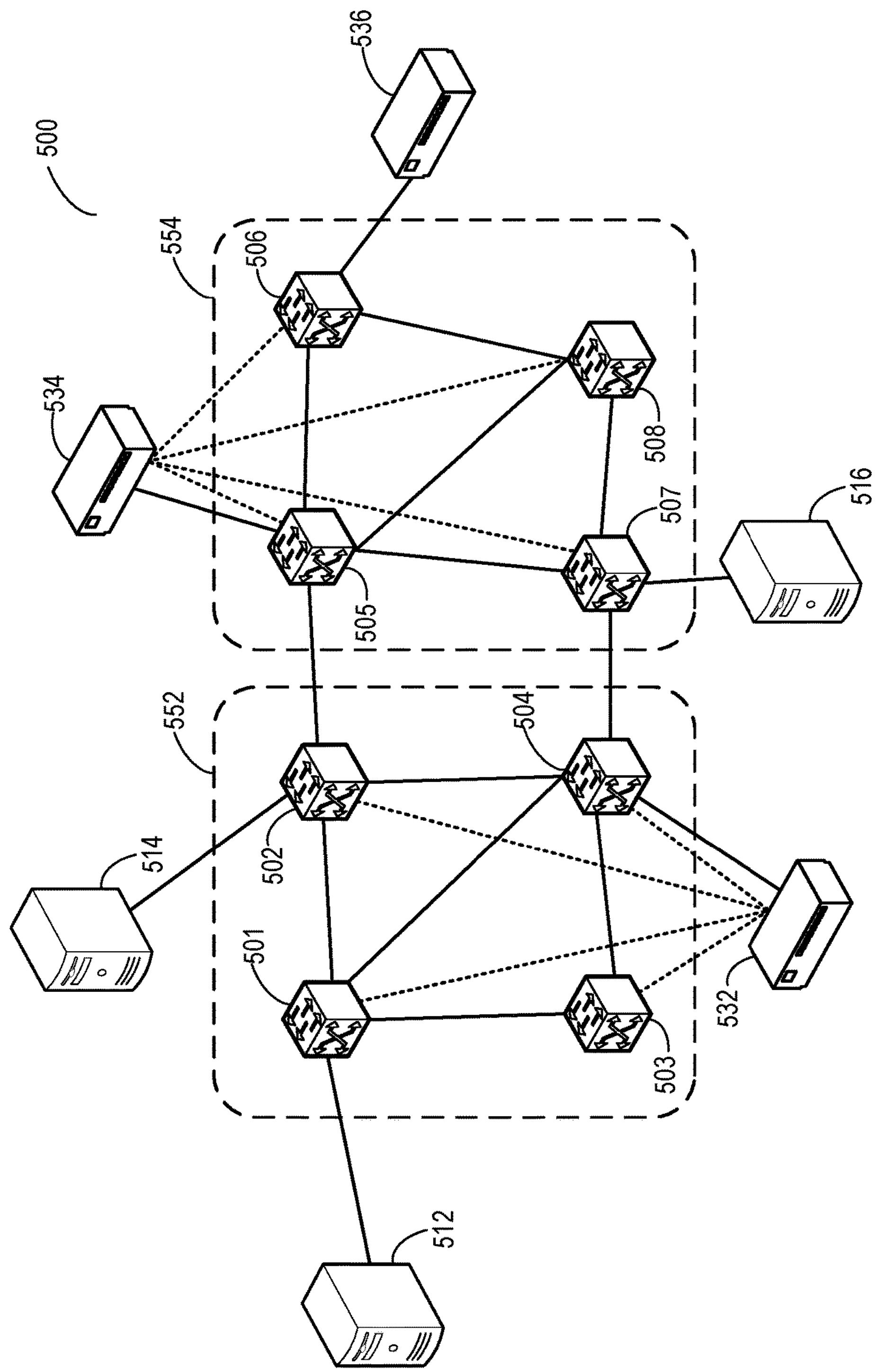
FIG. 5 illustrates an exemplary software-defined network with an intelligent networking device operating as a controller, in accordance with an embodiment of the present invention.

In some embodiments, an intelligent networking device can operate as the controller of a software-defined network instead of a separate controller. FIG. 5 illustrates an exemplary software-defined network with an intelligent networking device operating as a controller, in accordance with an embodiment of the present invention. A network 500 includes two software-defined networks 552 and 554. Network 552 includes software-definable switches 501, 502, 503, and 504. Intelligent networking device 532 operates as the controller for network 552. Though device 532 is physically coupled only to switch 504, device 532 is logically coupled to all software-definable switches in network 552. The logical connection between device 532 and a respective switch in network 552 can include one or more physical links. End devices 512 and 514 are coupled to switches 501 and 502, respectively.

Similarly, network 554 includes software-definable switches 505, 506, 507, and 508. Intelligent networking device 534 operates as the controller for network 554. Though device 534 is physically coupled only to switch 505, device 534 is logically coupled to all software-definable switches in network 554. The logical connection between device 534 and a respective switch in network 554 can include one or more physical links. End device 516 is coupled to switch 507. Network 554 also includes another intelligent networking device 536. Though device 536 is not the controller, device 536 can still operate as the point of enforcement for one or more policies.

As described in conjunction with FIG. 3, devices 532 and 534 are capable of receiving expressed policies. In some embodiments, devices 532 and 534 support an application scripting engine for expressing the policy. Devices 532 and 534 operate as the point of policy enforcement and use their respective spare capability (e.g., processing and memory) to operate as controllers. Because of the co-location, devices 532 and 534 do not need to explicitly instruct a controller to generate any flow definition. Instead, based on the policy, devices 532 and 534 can locally generate the corresponding flow definitions.

Though traditional controllers can offer flexibility based on one or more applications running on the controller, such traditional controllers are typically equipped to handle only exception packets. Furthermore, a single controller managing a large network often cannot scale to handle intensive traffic volume. If intelligent networking devices 532 and 534 have sufficient capability, devices 532 and 534 can overcome such limitations by providing flexible policy enforcement and dividing a large network (e.g., network 500) into separately controlled smaller networks (e.g., networks 552 and 554). In this way, devices 532 and 534 offer a flexible platform to deploy policies in a network and are suitable for operating as controllers.

Figure 6:
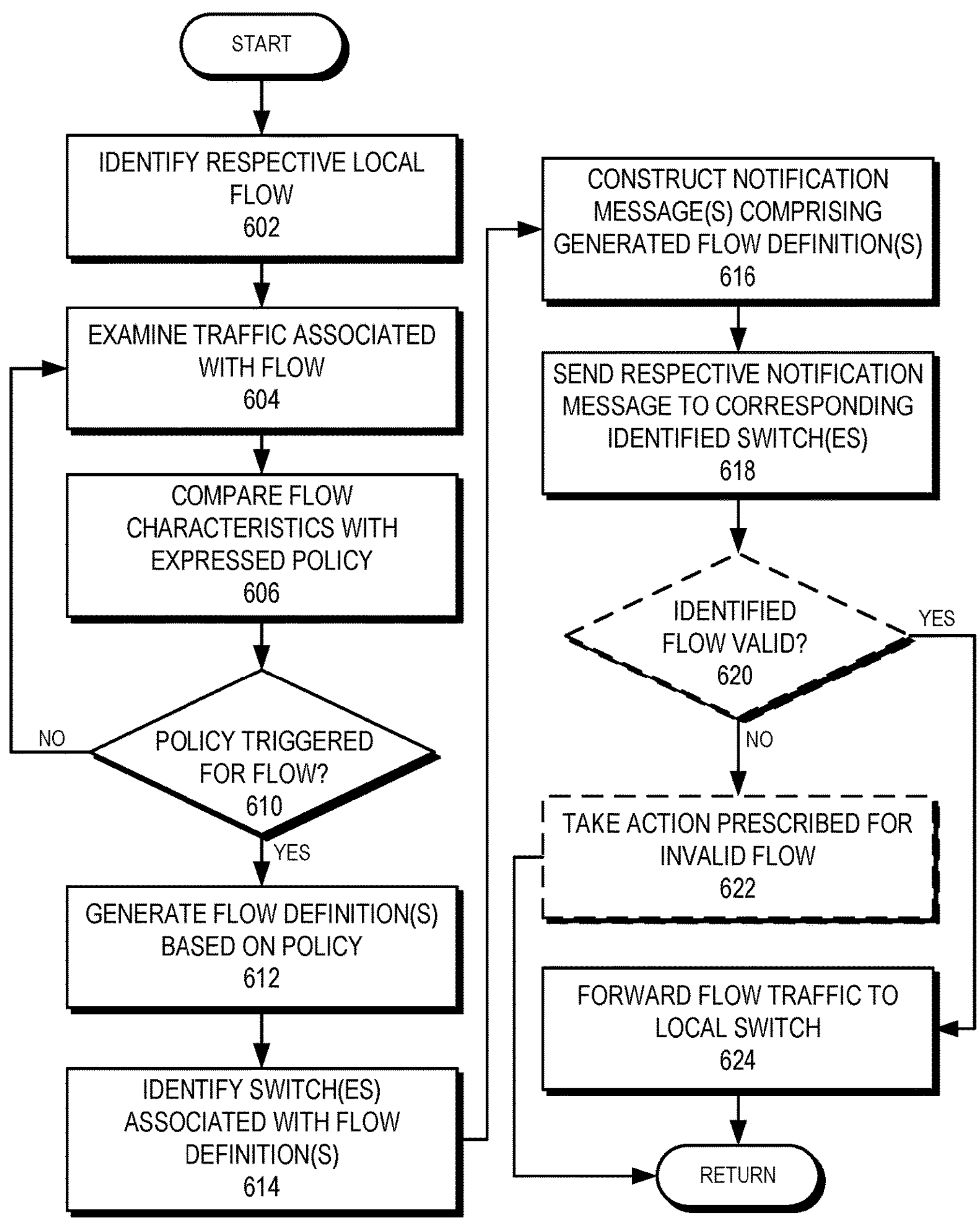
FIG. 6 presents a flowchart illustrating the process of generating flow definitions by an intelligent networking device operating as a controller based on local policy enforcement in a software-defined network, in accordance with an embodiment of the present invention.

FIG. 6 presents a flowchart illustrating the process of generating flow definitions by an intelligent networking device operating as a controller based on local policy enforcement in a software-defined network, in accordance with an embodiment of the present invention. The device identifies a respective local flow (operation 602). The device then examines the received data traffic associated with the flow (operation 604) and compares the flow characteristics with an expressed enforced policy (operation 606). This policy can be expressed by a network administrator using an application scripting engine. The device checks whether a policy, which can be a different policy than the expressed policy, has been triggered for the flow (operation 610), as described in conjunction with FIG. 3.

If no policy has been triggered, the device continues to examine the traffic (operation 604). Otherwise, the device generates one or more flow definitions based on the policy (operation 612). The device identifies the switch(es) associated with the flow definition(s) (operation 614), constructs notification message(s) comprising the flow definition(s) (operation 616), and sends a respective notification message to the corresponding identified switch(es) (operation 618). The device can operationally check whether the flow is a valid flow based on a service provided by the device (operation 620). If the identified flow is invalid, the device takes action prescribed for the invalid flow (operation 622). If the identified flow is valid, the device forwards the flow traffic to the local switch from which the flow traffic is received (operation 624).

Exemplary Switch

Figure 7:
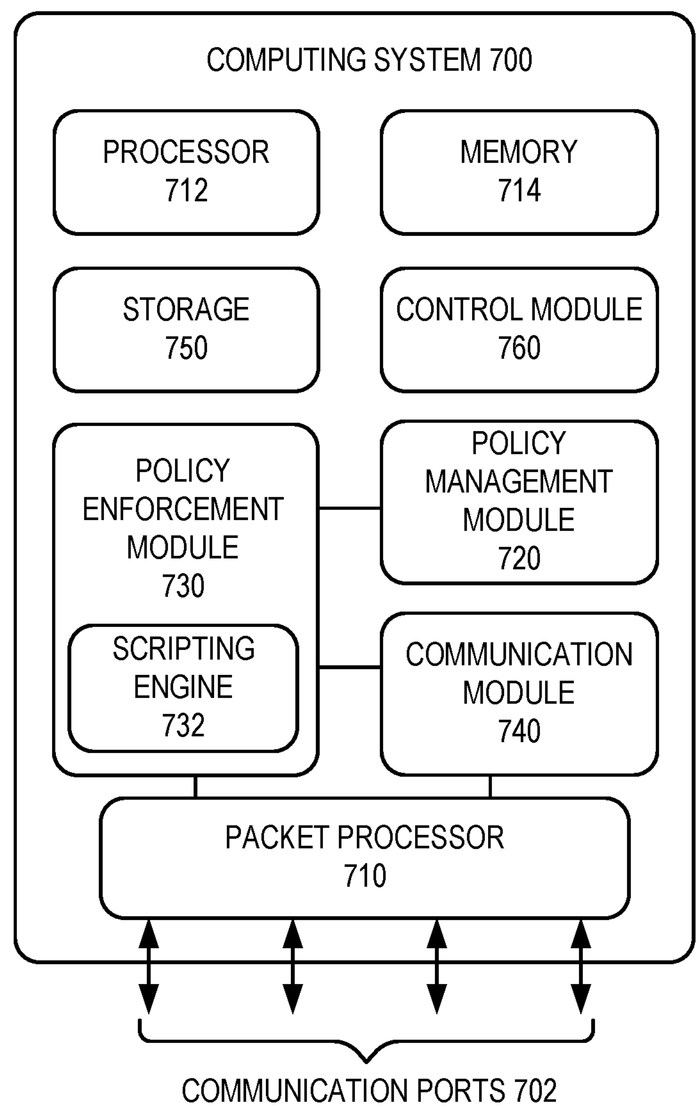
FIG. 7 illustrates an exemplary computing system capable of providing feedback to a controller in a software-defined network, in accordance with an embodiment of the present invention.

FIG. 7 illustrates an exemplary computing system capable of providing feedback to a controller in a software-defined network, in accordance with an embodiment of the present invention. In this example, a computing system 700 includes a general purpose processor 712, a memory 714, a number of communication ports 702, a policy management module 720, a communication module 740 which is coupled to policy management module 720, a packet processor 710, and a storage 750. Memory 714 can be a non-transitory memory which stores instructions that when executed by processor 712 cause computing system 700 to provide feedback to the controller, enforce the provided feedback, and/or operate the computing system as a controller. Computing system 700 can have a logical connection with the controller similar to the logical connections between a software-definable switch and the controller in the software-defined network. In some embodiments, the software-defined network is an OpenFlow-enabled network.

Policy management module 720 can be a module that is based on software, hardware, or a combination thereof. For example policy management module 720 can be a set of instructions stored in a storage device and when executed by a processor perform the aforementioned methods. Policy management module 720 can also be partly or entirely implemented in hardware, such as application-specific integrated circuit (ASIC) or field programmable gate array (FPGA). Policy management module 720 recognizes a local policy indicating how a data traffic flow is to be processed. This policy can be a security, operational, or data forwarding policy. During operation, policy management module 720 identifies a data traffic flow associated with the policy. Based on the identification, communication module 740 constructs a feedback message comprising a request for a flow definition from the controller. This flow definition indicates how the data traffic flow is processed in the software-defined network. Packet processor 710 transmits the message via one of the communication ports 702. Upon receiving a packet belonging to the data traffic flow, communication module 740 identifies the packet's association with the data traffic flow.

Policy management module 720 determines whether the packet matches the policy. If the packet matches the policy, policy management module 720 instructs communication module 740 to construct the feedback message, as described in conjunction with FIG. 1A. Policy management module 720 also distinguishes between a data packet and a control packet, and matches the packet with the policy accordingly, as described in conjunction with FIG. 1B. In some embodiments, computing system 700 includes a service module 760, which operates computing system 700 as an appliance. Service module 760 provides a service associated with the policy to the software-defined network.

In some embodiments, computing system 700 also includes a policy enforcement module 730, which is coupled to policy management module 720. Policy enforcement module 730 marks the request in the feedback message as enforced, which indicates compulsory enforcement of the request. Computing system 700 can also include a scripting engine 732, which is associated with policy enforcement module 730. Scripting engine 732 is capable of receiving an expressed policy in a recognizable format. For example, if scripting engine 732 is an OpenScript-based application scripting engine, any policy expressed in scripting code of OpenScript format is recognized by scripting engine 732.

In some embodiments, computing system 700 also includes a control module 760, which operates computing system 700 as a controller of the software-defined network. Control module 760 provides to computing system 700 all the necessary functionalities required by a controller. For example, control module 760 generates a respective flow definition for the software-defined network. Note that such generation is independent from any other controller (i.e., the switches controlled by computing system 700 are not actively controlled by any other controller). Control module 760 identifies one or more switches in the software-defined network associated with the flow definition. Communication module 740 then constructs a notification message comprising the flow definition for the switches.

Note that the above-mentioned modules can be implemented in hardware as well as in software. In one embodiment, these modules can be embodied in computer-executable instructions stored in a memory which is coupled to one or more processors in computing system 700. When executed, these instructions cause the processor(s) to perform the aforementioned functions.

In summary, embodiments of the present invention provide a computing system and a method for providing feedback to a controller in a software-defined network. In one embodiment, the computing system includes a policy management module and a communication module coupled to the policy management module. During operation, the policy management module recognizes a local policy indicating how a data flow is to be processed and identifies a data flow associated with the policy. The communication module constructs a request for a flow definition from a controller in a software-defined network. A flow definition indicates how the data flow is processed in the software-defined network.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing system, comprising:

management circuitry configured to:

inspect a packet belonging to a data flow for providing a service; and determine whether the data flow is a candidate for offloading from the computing system to a new data path, which is different from a current data path of the data flow, based on the inspection and a bandwidth requirement of the data flow;

and communication circuitry configured to, in response to determining that the data flow is a candidate for offloading, construct a feedback message requesting a flow definition for offloading the data flow from the computing system to the new data path, wherein the flow definition indicates how the data flow is processed in a software-defined network.

2. The computing system of claim 1, wherein the current data path is a downstream data path of the data flow, and wherein the feedback message identifies the downstream flow path.

3. The computing system of claim 1, wherein the management circuitry is further configured to determine the bandwidth requirement of the data flow based on one or more of:

a port number associated with the data flow; and a header of the packet.

4. The computing system of claim 1, wherein the feedback message further indicates that the offloading is for payload packets, which are distinct from control packets, of the data flow, thereby precluding the controller from offloading the control packets of the data flow from the computing system.

5. The computing system of claim 1, wherein the computing system further comprising enforcement circuitry configured to facilitate additional services based on inspecting a packet belonging to a downstream data path of the data flow.

6. The computing system of claim 1, wherein the management circuitry is further configured to detect a termination of the data flow; and wherein the communication circuitry is further configured to construct a notification message, which is destined for the controller and indicates a termination of the data flow, thereby requesting a flow definition for terminating the offloaded data flow.

7. The computing system of claim 1, wherein the management circuitry is further configured to clear states associated with the data flow in response to detecting a termination of the data flow.

8. A computer-executable method, comprising:

inspecting, by a computer system, a packet belonging to a data flow for providing a service; and determining whether the data flow is a candidate for offloading from the computing system to a new data path, which is different from a current data path of the data flow, based on the inspection and a bandwidth requirement of the data flow; and in response to determining that the data flow is a candidate for offloading, construct a feedback message requesting a flow definition for offloading the data flow from the computer system to the new data path, wherein the flow definition indicates how the data flow is processed in a software-defined network.

9. The method of claim 8, wherein the current data path is a downstream data path of the data flow, and wherein the feedback message identifies the downstream flow path.

10. The method of claim 8, further comprising determining the bandwidth requirement of the data flow based on one or more of:

a port number associated with the data flow; and a header of the packet.

11. The method of claim 8, wherein the feedback message further indicates that the offloading is for payload packets, which are distinct from control packets, of the data flow, thereby precluding the controller from offloading the control packets of the data flow from the computer system.

12. The method of claim 8, further comprising facilitating additional services based on inspecting a packet belonging to a downstream data path of the data flow.

13. The method of claim 8, further comprising:

detecting a termination of the data flow; and constructing a notification message, which is destined for the controller and indicates a termination of the data flow, thereby requesting a flow definition for terminating the offloaded data flow.

14. The method of claim 8, further comprising clearing states associated with the data flow in response to detecting a termination of the data flow.

15. A non-transitory computer-readable storage medium storing instructions that when executed by a computer cause the computer to perform a method, the method comprising:

inspecting, by a computer system, a packet belonging to a data flow for providing a service; and determining whether the data flow is a candidate for offloading from the computing system to a new data path, which is different from a current data path of the data flow, based on the inspection and a bandwidth requirement of the data flow; and in response to determining that the data flow is a candidate for offloading, construct a feedback message requesting a flow definition for offloading the data flow from the computer system to the new data path, wherein the flow definition indicates how the data flow is processed in a software-defined network.

16. The non-transitory computer-readable storage medium of claim 15, wherein the current data path is a downstream data path of the data flow, and wherein the feedback message identifies the downstream flow path.

17. The non-transitory computer-readable storage medium of claim 15, wherein the method further comprises determining the bandwidth requirement of the data flow based on one or more of:

a port number associated with the data flow; and a header of the packet.

18. The non-transitory computer-readable storage medium of claim 15, wherein the feedback message further indicates that the offloading is for payload packets, which are distinct from control packets, of the data flow, thereby precluding the controller from offloading the control packets of the data flow from the computer system.

19. The non-transitory computer-readable storage medium of claim 15, wherein the method further comprises:

detecting a termination of the data flow; and constructing a notification message, which is destined for the controller and indicates a termination of the data flow, thereby requesting a flow definition for terminating the offloaded data flow.

20. The non-transitory computer-readable storage medium of claim 15, wherein the method further comprises clearing states associated with the data flow in response to detecting a termination of the data flow.

* * * * *